(12) United States Patent (10) Patent No.: US 7,779,165 B2
Moir et al. (45) Date of Patent: Aug. 17, 2010

(54) SCALABLE METHOD FOR PRODUCER AND CONSUMER ELIMINATION

(75) Inventors: Mark S. Moir, Hampton, NH (US); Daniel S. Nussbaum, Cambridge, MA (US); Ori Shalev, Givaat-Shmuel (IL); Nir N. Shavit, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 1049 days.

(21) Appl. No.: 11/325,150

(22) Filed: Jan. 4, 2006

(65) Prior Publication Data

US 2006/0123156 A1 Jun. 8, 2006

Related U.S. Application Data

(63) Continuation-in-part of application No. 10/966,465, filed on Oct. 15, 2004.

(60) Provisional application No. 60/580,829, filed on Jun. 18, 2004, provisional application No. 60/373,359, filed on Apr. 17, 2002, provisional application No. 60/347,773, filed on Jan. 11, 2002.

(51) Int. Cl.
    *G06F 3/00* (2006.01)
(52) U.S. Cl. .................. 710/4; 710/15; 710/20; 710/22; 710/52; 712/32; 712/201; 712/215; 712/225
(58) Field of Classification Search ............ 710/4, 710/15, 20, 22, 52, 54; 712/32, 201, 215, 712/225
See application file for complete search history.

(56) References Cited

U.S. PATENT DOCUMENTS

| 2,889,262 | A | * | 6/1959 | Holm et al. ............... 208/34 |
| 4,584,640 | A | | 4/1986 | MacGregor et al. |
| 5,224,215 | A | | 6/1993 | Disbrow |
| 5,319,778 | A | | 6/1994 | Catino |

(Continued)

OTHER PUBLICATIONS

"Elimination Trees and the Construction of Pools and Stacks; Preliminary Version"; Nir Shavit, Dan Touitou; Proceedings of the Seventh Annual ACM Symposium on Parallel Algorithms and Architectures SPAA '95; 10 pages.

(Continued)

*Primary Examiner*—Tariq Hafiz
*Assistant Examiner*—Jasjit S Vidwan
(74) *Attorney, Agent, or Firm*—Robert C Kowert; Meyertons, Hood, Kivlin, Kowert & Goetzel, P.C.

(57) ABSTRACT

Producers and consumer processes may synchronize and transfer data using a shared data structure. After locating a potential transfer location that indicates an EMPTY status, a producer may store data to be transferred in the transfer location. A producer may use a compare-and-swap (CAS) operation to store the transfer data to the transfer location. A consumer may subsequently read the transfer data from the transfer location and store, such as by using a CAS operation, a DONE status indicator in the transfer location. The producer may notice the DONE indication and may then set the status location back to EMPTY to indicate that the location is available for future transfers, by the same or a different producer. The producer may also monitor the transfer location and time out if no consumer has picked up the transfer data.

20 Claims, 10 Drawing Sheets

U.S. PATENT DOCUMENTS

| | | | | |
|---|---|---|---|---|
| 5,471,583 | A * | 11/1995 | Au et al. | 710/57 |
| 5,586,321 | A | 12/1996 | Shavit et al. | |
| 5,787,480 | A * | 7/1998 | Scales et al. | 711/148 |
| 5,884,099 | A * | 3/1999 | Klingelhofer | 710/52 |
| 5,937,199 | A * | 8/1999 | Temple | 710/262 |
| 5,941,964 | A * | 8/1999 | Young et al. | 710/100 |
| 6,356,938 | B1 * | 3/2002 | Munoz et al. | 709/208 |
| 6,360,219 | B1 | 3/2002 | Bretl et al. | |
| 6,360,220 | B1 | 3/2002 | Forin | |
| 6,581,063 | B1 | 6/2003 | Kirkman | |
| 6,615,216 | B1 | 9/2003 | Hu | |
| 6,651,146 | B1 | 11/2003 | Srinivas et al. | |
| 6,826,757 | B2 | 11/2004 | Steele et al. | |
| 6,889,262 | B1 * | 5/2005 | Gulick | 710/5 |
| 6,904,456 | B2 | 6/2005 | Cox | |
| 6,996,640 | B1 * | 2/2006 | Hill et al. | 710/56 |
| 2003/0202383 | A1 * | 10/2003 | Shiota et al. | 365/185.33 |
| 2003/0217138 | A1 * | 11/2003 | Shimba et al. | 709/223 |
| 2004/0250254 | A1 * | 12/2004 | Frank et al. | 719/310 |
| 2005/0080948 | A1 | 4/2005 | Rowlands | |
| 2005/0185493 | A1 * | 8/2005 | Fujioka et al. | 365/230.05 |
| 2005/0246186 | A1 | 11/2005 | Nikolov | |
| 2005/0283566 | A1 * | 12/2005 | Callaghan | 711/104 |
| 2006/0123156 | A1 | 6/2006 | Moir et al. | |
| 2006/0161919 | A1 * | 7/2006 | Onufryk et al. | 718/102 |

OTHER PUBLICATIONS

"A Scalable Lock-free Stack Algorithm"; Danny Hendler, Nir Shavit, Lena Yerushalmi; ACM Symposium on Parallelism in Architectures and Algorithms, 2004; 10 pages.

"Simple, Fast and Practical Non-blocking and Blocking Concurrent Queue Algorithms"; Maged M. Michael and Michael L. Scott; Proceedings of the 15th Annual ACM Symposium on Principles of Distributed Computing; pp. 219-228 (1996).

* cited by examiner

SCALABLE METHOD FOR PRODUCER AND CONSUMER ELIMINATION

CONTINUATION DATA

This application is a Continuation-In-Part of U.S. patent application Ser. No. 10/966,465 entitled "Scalable and Lock-Free First-in-First-Out Queue Implementation," filed Oct. 15, 2004, whose inventors are Mark Moir, Ori Shalev and Nir N. Shavit, which claims benefit under 35 U.S.C. §119(e) of U.S. Provisional Application No. 60/580,829, titled "Lock-Free Shared Data Structures", inventors Nir N. Shavit, Danny Hendler, and Lena Yerushalmi, filed Jun. 18, 2004. The Ser. No. 10/966,465 application also claims benefit under 35 U.S.C. §120 of patent application Ser. No. 10/340,156 titled "Value Recycling Facility for Multithreaded Computations," inventors Mark S. Moir, Victor Luchango and Maurice Herlihy, filed on Jan. 10, 2003, which claims benefit of Provisional Application No. 60/373,359 titled "Wait-free mechanism for supporting dynamic-sized data structures, implementations of the wait-free mechanism and exploitations thereof for exemplary classes of data structures and software development/transformation techniques", whose first named inventor is Mark S. Moir, and was filed on Apr. 17, 2002. The Ser. No. 10/340,156 application also claims benefit of Provisional Application No. 60/347,773 titled "Lock-free mechanism for supporting dynamic-sized data structures, implementations of the lock-free mechanism and exploitations thereof for exemplary classes of data structures and software development/transformation techniques", whose first named inventor is Mark S. Moir, and was filed on Jan. 11, 2002. All of the applications listed above are herein incorporated by reference in their entirety.

BACKGROUND OF THE INVENTION

1. Field of the Invention

This invention relates to the field of memory management and more particularly to consumer and producer elimination.

2. Description of the Related Art

Elimination is a parallelization technique that allows producer and consumer processes or threads to transfer data without having to access a shared central data structures. For example, the shared queue structure of a first-in-first-out (FIFO) queue implementation is an example of such a shared central data structure. A traditional FIFO queue supports an enqueue operation, which places a value at the end of a shared central queue, and a dequeue operation, which removes the first value (if any) from the front of the central queue. Concurrent FIFO queues are widely used in a variety of systems and applications. For example, queues are an essential building block of concurrent data structure libraries such as JSR-166, the Java® Concurrency Package described in *Concurrent Hash Map in JSR166 Concurrency Utilities* by D. Lea, which can be found online at gee.cs.oswego.edu/dl/concurrency-interest/index.html (please note spaces have been included in the above URL reference to prevent it from being recognized as an active link in document viewing programs). However, as the number of processes that enqueue and dequeue data on the FIFO queue increases, the more times an individual process may be blocked due to locking preventing simultaneous access to the main FIFO queue. Similar situations may occur when multiple processes attempt to use a single, shared central stack, or a last-in-first-out (LIFO) queue, as well. Elimination allows matching pairs of producer and consumer processes (or threads) to transfer data when a central data structure, such as a stack or queue is blocked due to concurrent access.

In recent years, progress has been made towards practical lock-free FIFO queue implementations that avoid the numerous problems associated with traditional lock-based implementations. In particular, the lock-free FIFO queue implementation of Michael and Scott described in *Simple, fast, and practical nonblocking and blocking concurrent queue algorithms* in *Proceedings of the 15$^{th}$ Annual ACM Symposium on Principles of Distributed Computing*, pages 219-228 (1996) (hereinafter referred to as MS-queue) outperforms previous concurrent FIFO queues across a wide variety of loads. A key reason is that the MS-queue algorithm allows enqueue and dequeue operations to complete without synchronizing with each other when the queue is nonempty. In contrast, many previous algorithms have the disadvantage that enqueue operations interfere with concurrent dequeue operations. Nonetheless, the MS-queue still requires concurrent enqueue operations to synchronize with each other, and similarly for concurrent dequeue operations. As a result, as the number of threads concurrently accessing the central queue increases, the head and the tail of the queue become bottlenecks, and performance generally suffers. Therefore, while the MS-queue algorithm provides good performance on small-to-medium machines, it does not scale well to larger machines.

Various elimination techniques are available. For example, Shavit and Touitou introduce an elimination technique in *Theory of Computing Systems*, 30:645-670 (1997). Their elimination technique is used to implement a scalable stack and is based on the observation that if a push operation on a stack is immediately followed by a pop operation, then there is no net effect on the contents of the stack. Therefore, if a push and pop operation can somehow "pair up" the pop operation can return the element being added by the push operation, and both operations can return, without making any modification to the stack. In other words, we "pretend" that the two operations instantaneously pushed the value onto the stack and then popped it. The mechanism by which push and pop operations can pair up without synchronizing on centralized data allows exploitation of this observation.

Shavit and Touitou implement a stack that uses a tree-like structure that operations use to attempt to pair up and eliminate each other. The implementation is lock-free and scalable, but is not linearizable, which is discussed in *Linearizability: A Correctness Condition for Concurrent Objects* by M. Herlihy and J. Wing in *ACM Transaction on Programming Languages and Systems*, 12(3):462-492 (1990).

Shavit and Zemach introduced combining funnels in *Combining funnels: a dynamic approach to software combining, Journal of Parallel Distributed Computing*, 60(11):1355-1387 (2000), and used them to provide scalable stack implementations. Combining funnels employ both combining and elimination to achieve good scalability. They improve on elimination trees by being linearizable, but unfortunately they are blocking.

Both the elimination tree approach and the combining funnels approach are directed at scalability under high load, but their performance is generally substantially worse than other stack implementations under low loads. This may be a significant disadvantage, as it is often difficult to predict load ahead of time and load may vary over the lifetime of a particular data structure.

Additionally, Hendler, Shavit, and Yerushalmi introduced a scalable stack implementation in *A Scalable Lock-Free Stack Algorithm, Proceedings of the 16$^{th}$ Annual ACM Symposium* on *Parallelism in Algorithms and Architectures*, pages 206-215, ACM Press (2004). This scalable stack implementation performs well at low loads as well as being scalable under increasing load. Their implementation builds on a conventional (non-scalable) lock-free stack implementation. Such implementations typically use an optimistic style in which an operation succeeds if it does not encounter interference, and retries when it does. Since repeated retries on such stacks can lead to very poor performance, they are typically used with some form of backoff technique, in which operations wait for some time before retrying. However, as the load increases the amount of backoff required to reduce contention increases. Thus, while backoff can improve performance, it does not achieve good scalability.

The stack implementation introduced by Hendler et al. includes a stack (the central stack) and a "collision array." Operations first attempt to access the conventional stack, but in the case of interference, rather than simply waiting for some time and then trying again, they attempt to find another operation to pair up with for elimination. To achieve good scalability, this pairing up must be achieved without synchronizing on any centralized data. Therefore, a push operation chooses a location at random in the collision array and attempts to "meet" a pop operation at that location. Under higher load, the probability of meeting an operation with which to eliminate is higher, and this is key to achieving good scalability. However, the implementation introduced by Hendler at al. does not satisfy the properties of a FIFO queue.

SUMMARY

A lock-free method of data transfer between processes may involve an elimination technique in which a producer process stores data to a location in a transfer area or pool of memory and in which a consumer reads the data from that transfer location. In order to facilitate the transfer of information and to prevent multiple processes accessing or writing to the same location at the same time, producers and consumers may utilize and adhere to a particular elimination mechanism and/or protocol.

For instance, a FIFO queue implementation that includes an elimination structure and that tracks enqueue order valuing allows a lock-free, linearizable, scalable FIFO queue. Enqueue and dequeue operations are allowed to "eliminate" each other without synchronizing on centralized data (i.e. the shared, central queue structure), thus avoiding bottlenecks that restrict scalability. The enqueue and dequeue operations dynamically determine whether to access the central queue of the FIFO queue or attempt elimination in accordance with a heuristic that corresponds to system load.

In general, transfer pools and/or elimination structures can be used to transfer data between any producer and consumer processes. Traditionally, the transfer of data through an elimination structure requires six or more compare-and-swap (CAS) operations. CAS operations are traditionally considered expensive in terms of processor execution resources. In traditional approaches, both the producer and consumer use a CAS operation to swap a value into or out of the shared elimination array and up to two additional CAS operations to decide the outcome of the elimination. The elimination technique presented herein may, in some embodiments, only require two CAS operations to successfully transfer data between a producer and a consumer, one by the producer and one by the consumer.

The present invention enables producers and consumers to transfer data from the producer to the consumer. A producer and consumer wishing to exchange data may each locate a potential transfer location in shared memory. In some embodiments, locations are chosen at random from within a transfer pool or elimination structure. The producer may locate a transfer location that is not in use and may store data to be transferred in the selected transfer location. In some embodiments, individual transfer locations may have an associated status to help direct and coordinate the elimination process. For example, a producer may, in one embodiment, locate a transfer location that indicates a status of empty and may store a data value, or values, to be transferred in the transfer location. In some embodiments, a transfer location's status may be stored in the same memory location as the data to be transferred, if the range of possible transfer data values allows. In some embodiments producers and consumer may coordinate to determine a specific transfer location to use when transferring information, while in other embodiments each producer and consumer may locate transfer locations individually.

For instance, the various values that may represent a location's status may be represented by a set of reserved or predefined status values that may not be valid as data values to be transferred during elimination. For example, a reserved value representing an EMPTY status may be stored in a transfer location to indicate that the location is not currently in use. A producer may overwrite, such as by using a CAS command, a transfer location's status when storing the data to be transferred. A consumer may subsequently read the data from the transfer location and may set the transfer location's status to DONE, such as by using a CAS command, according to some embodiments. The producer may monitor the transfer location to determine that the consumer has retrieved the transferred data and set the transfer location's status to DONE. The producer may also set the transfer location's status to back to EMPTY to indicate that the location is no longer in use and is available for another transfer, either by the same or a different producer.

In some embodiments, only producers initiate elimination data transfers, while in other embodiments consumers may also initiate elimination data transfers. For example, a consumer may locate an empty transfer location (i.e. a location whose status is EMPTY) and may change the transfer location's status to WAITING, such as by a CAS command, to indicate that the consumer desires a producer to supply data to the consumer via that transfer location. A producer may notice that the consumer has set the status of the transfer location to WAITING and may then store data to the transfer location for the consumer to retrieve. In one embodiment, a producer may also set a privacy status for the transfer location to indicate whether or not the data stored by the producer in the transfer location is in response to a specific waiting consumer, in which case the data may be for that consumer alone, or whether the data stored in the transfer location is for any consumer to retrieve. In one embodiment, a predetermined portion of the transfer location may be set aside for use as a Boolean value indicating whether or not any transfer data stored in the transfer location is in response to a waiting consumer, or available for any consumer to retrieve.

In some embodiments, a transfer location's status may be indicated using reserved values that are not valid values for any data to be transferred through the location via elimination. In some embodiments, only two such reserved identifiers may be used, representing EMPTY and DONE status, respectively. In other embodiments, however, additional reserved status indicators may be used. For instance, in certain embodiments, a transfer location may have a status of WAITING and thus, a WAITING status indicator value may be reserved and not used as part of data being transferred.

In general, the elimination technique described herein may be used with any producer-consumer data transfer in which a producer and a consumer synchronize and agree that the consumer will take the producer's value. For example, the present invention applies to such applications as pools (unordered sets), stacks (LIFO ordered sets) and queues (FIFO ordered sets). A pool, also called a pipe, a global pool, or a producer/consumer buffer, may be considered a concurrent data-type which supports the abstract operations of enqueue, i.e. adding an element to the pool, and dequeue, i.e. deleting and returning an element from the pool.

Figure 1:
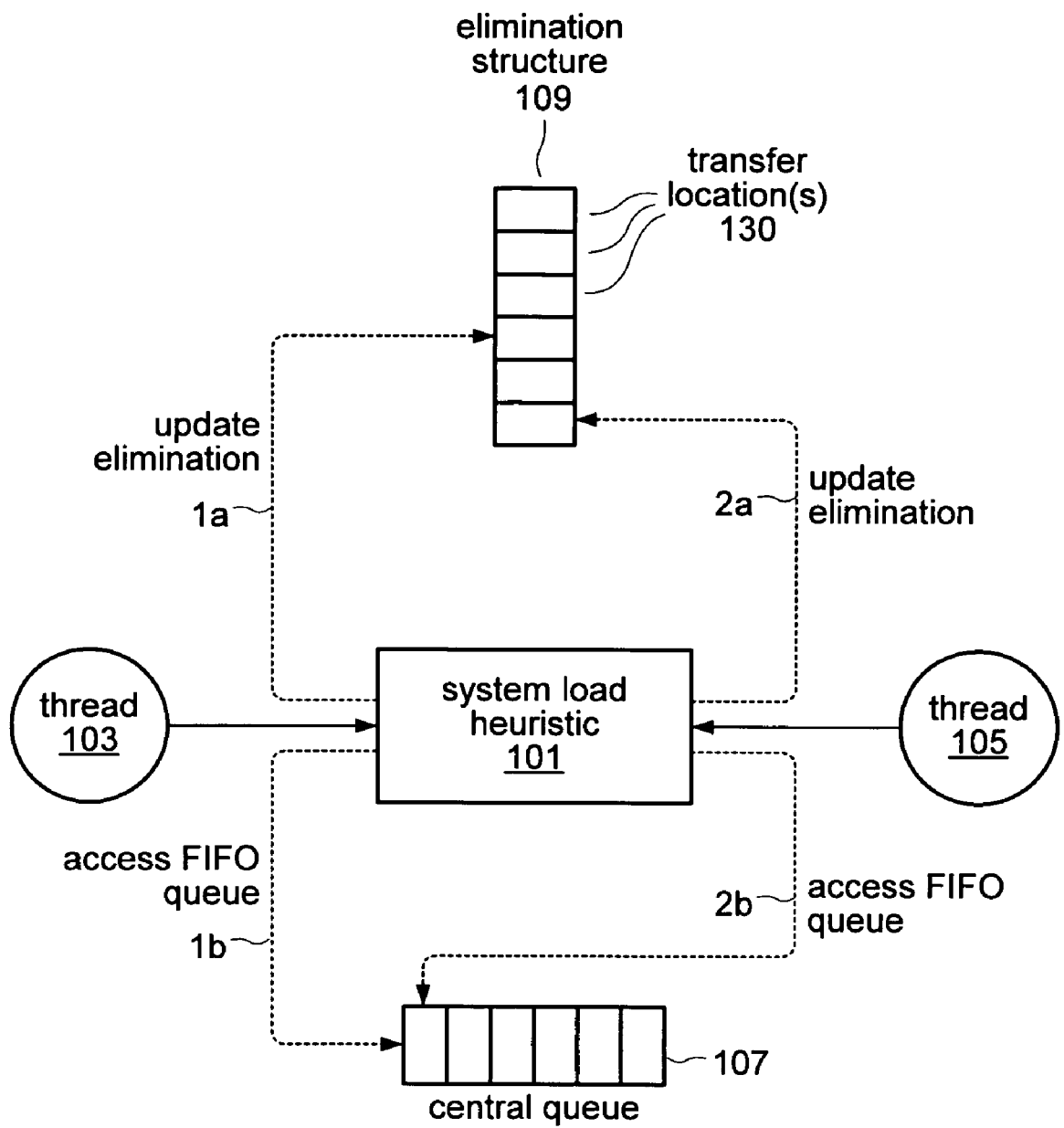
FIG. 1 is a block diagram illustrating an exemplary implementation of a lock-free scalable FIFO queue with elimination.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

An elimination technique for lock-free data transfer, or elimination, between producers and consumers is described herein. Producer and consumer elimination, as described herein, is mainly described with regard to how a consumer and producer exchange information after they have already agreed upon a location to perform the exchange. Producers and consumers, such as the enqueue and dequeue operations in a FIFO queue implementation, may agree on a transfer location in any of various ways, according to various embodiments. For example, in one embodiment, a producer and a consumer may transfer data using a single, predetermined location. In other embodiments, each producer and consumer may select transfer locations randomly. In general the method for producer and consumer elimination described herein may be used with virtually any elimination application, including a scalable first-in-first-out (FIFO) queue implementation that utilizes elimination techniques and includes a central queue (i.e. a central data structure to host enqueued values) and an lock-free elimination structure (e.g., a collision array). In other words, the elimination techniques described herein may be used with pool, stack and/or queue implementations, according to various embodiments.

A lock free data structure guarantees that after a finite number of steps of any operation, some operation completes. Blocking data structures based on locks do not provide this property because a thread that requires a lock that is already held by another thread can wait for an unbounded number of steps for the thread that holds the lock to release it. This may be a significant problem in practice, for example, if a thread is preempted while holding a lock.

However, elimination for a FIFO queue implementation may be more difficult than for a stack, because any enqueue-dequeue operation pair cannot be simply eliminated in the same way as any push-pop pair in a stack. While a push followed by a pop on a stack has no net effect on the stack, the same is not true for a FIFO queue implementation. For example, if a FIFO central queue contains a single value a, and the following operations occur: enqueue b, dequeue b, enqueue c, then the enqueue-dequeue operation pair for b cannot simply be eliminated because a dequeue of b cannot occur before a dequeue of a. The dequeue of b cannot occur before the dequeue of a because the enqueue of a completed before the enqueue of b. Thus, to avoid states inconsistent with a FIFO queue, operation pairs cannot simply be eliminated. If the queue is empty, however, then any enqueue-dequeue pair can be eliminated. The lock-free scalable FIFO queue implementation takes advantage of this observation about an empty FIFO queue and also allows elimination of enqueue-dequeue operation pairs even if the queue is not empty, without sacrificing linearizability. Linearizability is the standard correctness condition for concurrent data structures. A linearizable implementation provides the illusion that each operation occurs atomically at a single point between the time it is called and the time it returns. This is a significant advantage because it allows programmers to use data structures in a modular way.

The ordering property of a FIFO queue implementation does not prohibit elimination; it only restricts it to particular combinations of operations. More specifically, if an enqueue operation and a dequeue operation successfully pair up, and at some point t at or after this pairing, there are several values in the queue, then we can "pretend" that the enqueue operation took effect just before the enqueue of the first value in the queue and that the dequeue takes effect at time t. For linearizability, this is valid if the point at which we linearize the eliminated enqueue operation (i.e., the point at which we pretend the eliminated enqueue operation takes effect) comes 1) after the enqueue operation is invoked, and 2) before it returns. The second requirement is relatively easy to satisfy because the eliminated enqueue operation returns after successful elimination. The first requirement provides challenges satisfied by the lock-free scalable FIFO queue implementation.

Please note that the description herein includes exemplary systems, methods, techniques, instruction sequences and computer program products that embody techniques of the present invention. However, it is understood that the described invention may be practiced without these specific details. For example, the described invention may utilize any of a variety of generic first-in-first-out queues as a central queue in the first-in-first-out queue implementation. For instance, the central queue described herein is illustrated mainly with reference to the MS-queue, although the central queue may also be implemented in accordance with other queues such as that described in *An Optimistic Approach to Lock free FIFO Queues* by Edya Ladan Moses and Nir N. Shavit in 18th *International Conference on Distributed Computing*, LNCS 3274 Springer at pages 117-131 (2004). In other instances, well-known protocols, structures and techniques have not been shown in detail in order not to obscure the invention.

FIG. 1 depicts an exemplary implementation of a lock-free scalable FIFO queue that may utilize producer and consumer elimination, according to certain embodiments. A first-in-first-out (FIFO) queue implementation includes a central queue 107 and an elimination structure 109. The central queue 107 is shared among producer and consumer threads 103 and 105, each of which is performing either an enqueue operation or a dequeue operation. The threads 103 and 105 dynamically determine whether to access the central queue 107 based on a system load heuristic 101. The depicted system load heuristic 101 is illustrated solely to aid in understanding the invention and may be a single instance of code representing the system load heuristic 101, multiple instances for each thread, etc. Based on the system load heuristic 107, the thread 103 either accesses the central queue 107 as indicated by a dashed line 1*b*, or updates an elimination structure 109 as indicated by a dashed line 1*a*. Likewise, the thread 105 either accesses the central queue 107 as indicated by a dashed line 2*b* or updates the elimination structure 109 as indicated by a dashed line 2*a*. In accordance with the system load heuristic 101, threads update the elimination structure 109 to attempt to eliminate more operations, during high system load, or access the central queue 107 to either enqueue or dequeue values during lower system loads.

While the discussion above refers to FIG. 1 illustrating a FIFO queue, in some embodiments, FIG. 1 may also represent a stack, pool, or other data transfer implementation. For example, threads 103 and 105 may access central queue 107 according to a LIFO stack queue implementation. However, if a producer process, such as thread 103 is blocked due to concurrent access to central queue 107, thread 103 may still attempt to eliminate with a consumer process, such as thread 103 using elimination structure 109.

A variety of approaches to laying out data and choosing locations for elimination in order to ensure good locality will be apparent to one skilled in the art. In large machines, good choices for layout and access patterns affect scalability.

The FIFO queue illustrated in FIG. 1 may, in some embodiments be implemented as lock-free, scalable, and linearizable. A scalable FIFO queue may be built by using a FIFO queue implementation that is linearizable and lock-free, but not necessarily scalable, as a "central queue" and then using an elimination structure, such as a collision array, to allow enqueue-dequeue operation pairs to be eliminated only when it is correct to do so. Although various FIFO queue implementations can be used, the FIFO queue implementation described herein is based upon adaptation of the MS-queue implementation as the central queue due to its good properties under low load. The adaptation allows elimination of enqueue-dequeue operation pairs to determine when it is safe to eliminate. As noted above, while mainly described herein in regard to a FIFO queue implementation, the elimination techniques described herein may also be used in stack, pipe, or other data transfer applications.

A variety of mechanisms can be used to facilitate pairing of operations without synchronizing on central data (which may restrict scalability). Although various mechanisms are available, for simplicity, elimination is described herein mainly with reference to a collision array. In a simple collision array, threads pick random locations in order to try and collide. Pairs of threads that "collide" in some location use a lock-free synchronization protocol to attempt to agree that they can eliminate.

In some embodiments, a producer, such as thread 103, may initiate an elimination transfer to a consumer, while in other embodiments a consumer, such as thread 105, may initiate the elimination transfer. In yet other embodiments, either a producer or consumer may initiate elimination. Each entry or transfer location 130 in elimination structure 109 may include a status indicating the currently state of the location in regards to any data transfer using that location, according to some embodiments. For example, a transfer location 130 may initially be set to EMPTY or some other reserved value indicating that the entry is available for use. A producer thread 103 wishing to publish, share, or transfer data with one or more consumers may store a data value in a transfer location 130. In some embodiments, the act of storing data to the transfer location may also change the location's status. In other words, status values, such as EMPTY and/or DONE may be stored in the same location (i.e. at the same memory address) as data values for transfer during elimination. For instance, in one embodiment, a single byte address may be used both to hold a transfer location's status and to hold data to be transferred through the transfer location 130 between a producer and a consumer.

A producer and consumer pair may coordinate on the individual transfer location 130 to use during elimination. In general, there are many different methods and mechanisms for a producer and consumer to coordinate the use of particular entries. In some embodiments, particular producers and consumers may communicate ahead of time to determine which entry or entries they will use. In other embodiments, however, it may not matter which particular producer and consumer exchange data. For instance, in some applications multiple producers may work in parallel to provide data and multiple consumers may also work in parallel to acquire data. In such applications, any consumer may be able to acquire and use data from any of the producers. Thus, in some embodiments, thread 103 may be configured to store data to an entry or transfer location 130 of elimination structure 109 without communicating or coordinating with any consumer, such as thread 105, regarding the location. In some embodiments, producers may be configured to simply store data to the next free entry, using any of various methods to determine or maintain an ordering among the entries in a transfer pool. For exemplary purposes, the discussions herein refer to producers and consumers selecting transfer locations 130 from elimination structure 109 at random to attempt to collide with another thread for elimination.

After storing a data value to a transfer location 130 in elimination structure 109, a producer, such as thread 103, may wait until a consumer, such as thread 105, removes the value and sets the location's status to DONE. According to some embodiments, a consumer may set a location's status to DONE by storing a predefined value indicating that the data value has been read or "picked up" by the consumer. How long a producer waits for a consumer to read or pick up the transferred data may vary from application to application and from embodiment to embodiment. All producers may wait for the same predetermined or standard length of time or each producer may use a varying or dynamic timeout length depending upon the specifics requirements and/or implementation of each particular embodiment. If the producer notices that the consumer has picked up the data and set the transfer location's status to DONE, the producer may reset the transfer location's status to EMPTY in order to indicate that the location is available for use by the same or different producers and consumers. After resetting the transfer location's status to EMPTY, the producer thread may return an indication of the successful elimination.

As noted above, a transfer location's status may be indicated using reserved values that are not valid values for any data to be transferred through the location via elimination. In some embodiments, only two such reserved identifiers may be used, representing EMPTY and DONE status, respectively. In other embodiments, however, additional reserved status indicators may be used. For instance, in certain embodiments, a transfer location may have a status of WAITING and thus, a WAITING status indicator value may be reserved and not used as part of data being transferred.

When setting the transfer location contents from EMPTY to a data value to be transferred, a producer may use a compare-and-swap (CAS) operation, in some embodiments. The use of CAS commands or other atomic means to compare and store data in a transfer location may prevent another process, such as another producer or consumer, from writing to the transfer location at the same time as the producer. In some embodiments, only two CAS commands may be used during a single elimination between a producer thread 103 and a consumer thread 105. For example, the producer may use a CAS operation to verify that the status of a transfer location 130 is EMPTY and to store data to be transferred. Similarly, a consumer may use a CAS operation to set the status of a transfer location to DONE after retrieving the transfer data stored there. Other accesses and writes to the entry location may, by the nature of the specific elimination algorithm, be safe from concurrent writing, as will be explained in more detail below.

Generally, a CAS operation performs both a compare and a swap function. During producer and consumer elimination, the process or thread issuing (e.g. requesting or calling) a CAS operation may pass both a value that is expected to be in the location, such as an EMPTY status indicator, as well as a data value it desires to store in the location. A CAS operation may only store the new value to the location if the location has the expected value. If the location does not contain the expected value, the CAS command fails. Thus, in some embodiments, a producer may store data to a transfer location by using a CAS operation and specifying that an EMPTY status value is expected to be in the transfer location. If the transfer location is in fact EMPTY, the CAS operation may succeed. If, however, the transfer location does not contain an EMPTY status indicator, another producer may already by using that transfer location and the CAS operation may fail. In other embodiments, other synchronization primitives, such as load-linked/store-conditional pair, and transactional memory, may also be used when producers and consumers are transferring data to prevent two processes from accessing the same location at the same time.

The use of CAS operations may help to avoid two different processes updating the same location at the same time. For instance, a producer might read a storage location to verify that it is currently available or use. The producer may read the location and determine that is contains an EMPTY status, for example. The producer may then attempt to store transfer data to that location. However, due to the nature of concurrent and multi-threaded processing, another producer may also attempt to use the same location by storing transfer data to it after the original producer read the storage location (to verify its EMPTY status) but before the original producer was able to store its transfer data to the location. Thus, the producer that writes to the location second may overwrite the other producer's transfer data. The other producer may not have any way to know that is transfer data was overwritten. Additionally, after a consumer has picked up the data, both producers may assume that its data was successfully transferred. The use of CAS commands, or other atomic operations, to verify the current status of a transfer location and (atomically, at the same time) store a new value to that location may help to avoid a potential collision by two processes updating the same location, according to some embodiments.

A consumer may also use a CAS operation to set the transfer location's status to DONE by storing a DONE status indicator to the transfer location. After determining that a consumer has retrieved the transfer data, the producer may reset the location's status back to EMPTY by storing an EMPTY status indicator in the transfer location, according to some embodiments. Generally, the final resetting of the transfer location to the EMPTY status indicator may not require a CAS operation because only the producer should be accessing the transfer location at that point, since the consumer has already retrieved the transfer data from the location. Once a consumer has read the transfer value out of the transfer location and stored a DONE status indictor in the transfer location, no one but the original producer should be attempting to read/store any values from/to the transfer location. Consumers, even if accessing the transfer location in error, should see the DONE value and recognize that it does not contain any data to be transferred. Similarly, other producers should see the DONE value and not attempt to store any transfer data to that location.

As noted above, producers and consumers may use a CAS command, which atomically performs a "compare and swap" operation, to store a value into a transfer location, such as when storing a status indicator to a transfer location. An implementation of such a "compare and swap" operation first verifies that the value current stored at a specified address is the same as an expected value and then stores a new value in that address. In some embodiments, a CAS function may implemented similarly to the following sample pseudo-code:

```
bool CAS(addr:value *, oldval:value, newval:value)
{
    if (*addr == oldval) {
        *addr = newval;
        return true;
    } else {
        return false;
    }
}
```

In some embodiments, a producer or consumer may use a variation on a CAS operation, sometimes referred to as CAS-val, that returns the value that was stored in the relevant location rather than return a boolean value. For instance, many hardware platforms include an atomic CASval operation. The following pseudocode illustrates one possible implementation of a CASval function:

```
value CASval(addr: value *, oldval:value, newval:value)
{
    prev = *addr;
    if (prev == oldval) {
        *addr = newval;
    }
    return prev;
}
```

Generally, it is straightforward to implement a CAS operation (i.e. that returns a boolean value) using a CASval implementation. Please note that while various embodiments of producer and consumer elimination are described herein with reference to CASval operations, those same embodiments may be implemented using CAS operations. In general, producer and consumer elimination may be implemented using CAS, CASval, or other forms of atomic compare and swap operations. The following pseudo-code illustrates one implementation of a CAS function based on an underlying CASval implementation:

```
bool CAS(addr:value *, oldval: value, newval:value)
{
    return CASval(addr, oldval, newval) == oldval;
}
```

The following sample code illustrates an exemplary implementation of producer-initiated elimination using CAS commands, according to one embodiment.

```
// Note EMPTY and DONE are special and are
// not included in the "value" type).
elim_type = {EMPTY, DONE} union value
shared X: elim_type initially EMPTY
bool ProducerAttempt(v:value)
{
    if (X != EMPTY || !CAS(&X, EMPTY, v)) {
        return false;
    }
    shortdelay( );
    if (X == DONE || !CAS(&X, v, EMPTY)) {
        X = EMPTY;
        return true;
    }
    return false;
}
<bool, value> ConsumerAttempt( )
{
    elim_type x = X;
    if (x == EMPTY || x == DONE || !CAS(&X, x, DONE)) {
        return <false, ?>;       // ? indicates "don't care")
    }
    return <true, x>;
}
bool ProducerAttempt(v:value)
{
    if (X != WAITING) {
        return false;
    } else {
        return (CAS(&X, WAITING, v));
    }
}
```

While in some embodiments, any consumer may retrieve data from any producer, in other embodiments, such as a FIFO queue implementation, a producer and consumer must be qualified with each other before transferring data. Thus, various application and/or data structure characteristics (e.g. satisfiability conditions) may require various levels of qualification between producers and consumers (from none at all, to lock-step pairing), according to various embodiments. For example, in some embodiments, a scalable first-in-first-out (FIFO) queue implementation may utilize elimination techniques and may include a central queue (a central data structure to host enqueued values) and an elimination structure, such as a collision array). As noted above, the ordering property of a FIFO queue implementation does not prohibit elimination; it only restricts it to particular combinations of operations. Similarly, in a stack implementation, while any push-pop pair that occurs simultaneously may be eliminated, the two operations must not be separated by another push. In a stack implementation, a pop operation must eliminate with the most recent push operation. In other embodiments, however, any producer may eliminate with any consumer without regarding to any ordering property.

When a consumer attempts to retrieve data from an elimination structure 109 it may select a transfer location 130 at random and check to see if there is data waiting at that transfer location. For example, in some embodiments, if the transfer location does not indicate an EMPTY or DONE status, a valid value for potential elimination may be stored in that entry. If valid transfer data is not stored in the selected transfer location, then the elimination, or transfer, attempt fails and the consumer may return a failure status. Otherwise, the consumer may change the status of the transfer location to DONE, indicating to the producer that the elimination was successful.

Figure 2:
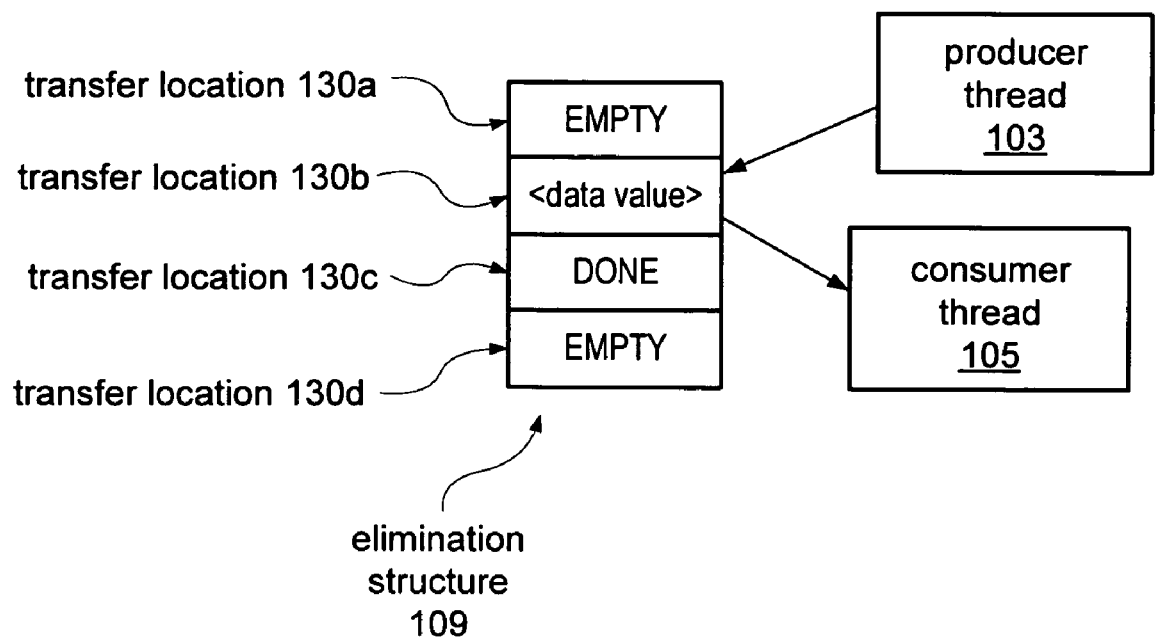
FIG. 2 is a block diagram illustrating various stages of a transfer location's status during producer and consumer elimination, according to one embodiment.

As noted above, the general sequence of events, according to some embodiments, that may occur when a producer transfers data to a consumer via elimination is that the producer changes the contents of the transfer location from EMPTY to the data value to be transferred, the consumer reads the transfer value and sets the contents of the transfer location to DONE, and the producer resets the transfer location by setting its status back to EMPTY. FIG. 2 is block diagram that illustrates the various states of a transfer location during producer and consumer elimination, as described herein. As noted above, in some embodiments, a location's status indicator may be stored in the same location or address as data to be transferred through the location. Thus, a transfer location, such as transfer location 130a may initially begin with a status of EMPTY. A producer thread 103 may locate a transfer location with a status of EMPTY and may store a data value in the transfer location and a consumer thread 105 may read the data value from the transfer location, as illustrated by transfer location 120b. The consumer thread 105 may then set the transfer location's status to DONE, as indicated by transfer location 130c, indicating to the producer thread 103 that the consumer successfully retrieved the data value. And finally, after determining that the consumer successfully retrieved the data value from the transfer location, the producer may reset the transfer location's status back to EMPTY, as depicted by transfer location 130d. Thus, FIG. 2 illustrates elimination structure 109 including four transition locations 130a, 130b, 130c, and 130d. Please note that FIG. 2 illustrates only four transfer locations for ease of discussion. In other embodiments, elimination structures, such as collision arrays, may include many more transfer locations. In FIG. 2, transfer locations 103a and 130d both contain a status value of EMPTY, thus indicating that they are available for use by producer and consumer thread to attempt elimination. Transfer location 130b contains a data value stored there by producer thread 103 for transfer, via elimination, to consumer thread 105. Transfer location 130d contains a status value of DONE, indicating according to some embodiments, that a consumer has retrieved data stored there by a producer. In some embodiments, the producer that originally stored the transfer data in a transfer location may reset the location's status back to EMPTY after a consumer has retrieved the stored transfer data and set the location's status to DONE.

In some embodiments, if a producer stores a data value to a transfer location, but no consumer picks it up before a certain amount of time (i.e. the producer times out), the producer may store an EMPTY status indicator to the transfer location to cancel the transfer. When canceling the elimination, such as after timing out, the producer may, in some embodiments, use a CAS or other atomic update command to store an EMPTY status indicator to the transfer location in order to prevent a consumer from accessing the transfer location at the same time. In other words, a producer may use a CAS command to prevent a consumer from retrieving the transfer data at the same instant that the producer times out and resets the transfer location's status back to EMPTY. For example, in one embodiment, a consumer thread 105 may access a transfer location 130, copy out the transfer data and set the transfer location's status to DONE at the same time that a producer thread 103 times out and cancels the transfer and resets the transfer location to the EMPTY state. When using CAS commands, the producer's CAS command to set the transfer location back to EMPTY may fail because the transfer location may already hold a DONE status indicator instead of the data value the producer expects to find there. A failing CAS operation to reset a transfer location's status back to EMPTY may inform a producer that a consumer has retrieved the transfer data and that the transfer was successful. The producer may, in some embodiments, check the contents of the transfer location to verify that a consumer stored a DONE status indicator there, thus indicating a successful transfer.

In some embodiments, rather than just using a CAS statement to update the contents of the transfer location, producers and consumers may first read the value of the transfer location to see whether it contains an expected value before performing the CAS command. For instance, rather than just using a CAS command to store a transfer value to a transfer location, a producer may first read the contents of the transfer location to determine whether or not the transfer location is EMPTY and thus is available for a use in a transfer. If the transfer location does contain an EMPTY value, the producer may then issue the CAS command to actually store the transfer value to the transfer location. The use of a CAS command to store a value to the transfer location may still be required even if the producer has already verified that the transfer location is EMPTY in order to avoid a collision with another producer that may also be attempting to use the same transfer location.

Figure 3A:
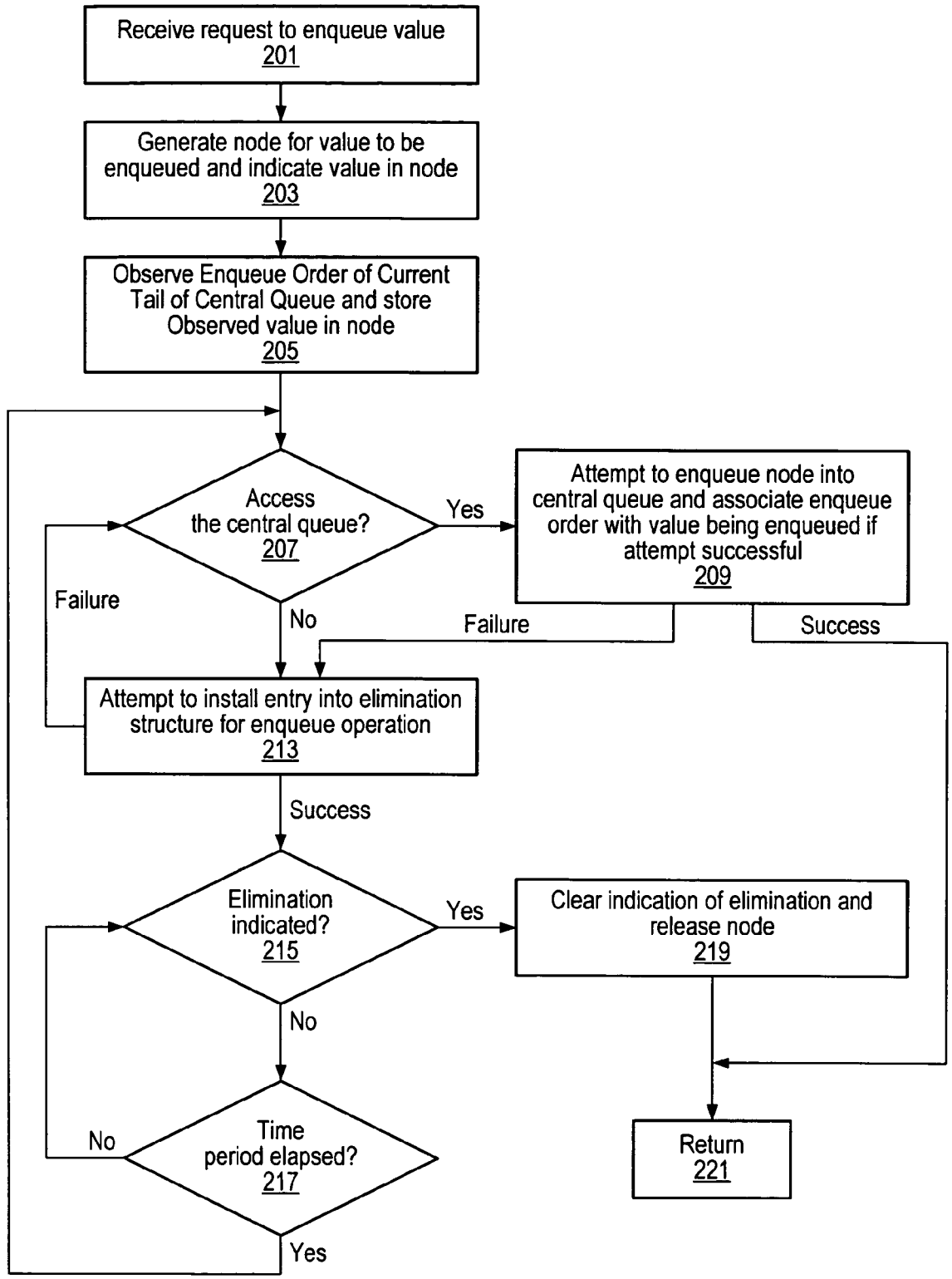
FIG. 3A is a flowchart illustrating one embodiment of a method of enqueuing on a lock-free scalable FIFO queue implementation.

FIG. 3A depicts a flowchart illustrating one method for an enqueue operation on a lock-free scalable FIFO queue implementation. At block 201, a request to enqueue a value is received. At block 203, a node is generated for the value to be enqueued, and the value is indicated in the generated node. At block 205, an enqueue order of a current tail of the central queue is observed and the observed enqueued order value is stored in the generated node. For example, the enqueue order value of the current tail node of the central queue is stored. At block 207, it is determined whether to access the central queue. If the central queue is to be accessed, the control flows to block 209. If the central queue is not to be accessed, then control flows to block 213.

At block 209, an attempt is made to enqueue the value. Attempting to enqueue the value includes attempting to enqueue the node into the central queue and associating an enqueue order value with the value being enqueued. For example, the enqueue operation uses the previously observed enqueue order value of the tail and associates an enqueue order value that is greater than the tail enqueue order value with the value to be enqueued by the enqueue operation. If the attempt fails, then control flows to block 213. If the attempt is successful, then control flows to block 221. At block 221, control returns to a calling computation (i.e., control returns to a procedure, function, or method that invoked the enqueue operation). Realizations of the described invention may return an indication of successful enqueue.

At block 213, elimination is attempted. Attempting elimination includes attempting to install an entry in the elimination structure for the enqueue operation. For example, an entry in a collision array, such as elimination structure 109, is selected (e.g., randomly selected, in some embodiments) and if the selected entry is empty (e.g. if it holds an EMPTY status indicator), then the selected entry may be updated to indicate the generated node (e.g., a pointer to the node is set). The collision array size can be adapted dynamically to maintain the right balance between ease of finding an empty slot for Enqueues and ease of finding a full slot for Dequeues. For example, a new collision array can be switched in at any time, allowing operations already using the old collision array to complete their attempts on the old collision array and use the new collision array next time. Memory management of the old arrays can be handled using existing memory management techniques such as those described in U.S. patent application Ser. No. 10/340,156 entitled "VALUE RECYCLING FACILITY FOR MULTITHREADED COMPUTATIONS," naming as inventors Mark S. Moir, Victor Luchango and Maurice Herlihy and filed on Jan. 10, 2003, which is incorporated herein by reference in its entirety. If the elimination attempt fails, then control flows to block 207. If the entry is successfully installed into the elimination structure, then control flows to block 215.

At block 215, it is determined whether elimination is indicated. For example, the thread determines whether the installed entry indicates DONE. If elimination is indicated, then control flows to block 219. If elimination is not indicated then control flows to block 217.

At block 217, it is determined whether a given time period has elapsed. If the time period has not elapsed, then control flows back to block 215. If the time period has elapsed, then control flows back to block 207. Various realizations of the described invention utilize different techniques for deciding when to give up waiting for elimination. For example, a load based heuristic might contribute to this decision.

At block 219, the indication of elimination is cleared and the node released. For example, the installed entry is modified to indicate EMPTY. Control flows from block 219 to block 221. Realizations of the described invention may return an indication of the successful elimination, or return an indication of success, regardless of whether the enqueue operation was eliminated or the node was inserted into the central queue.

Figure 3B:
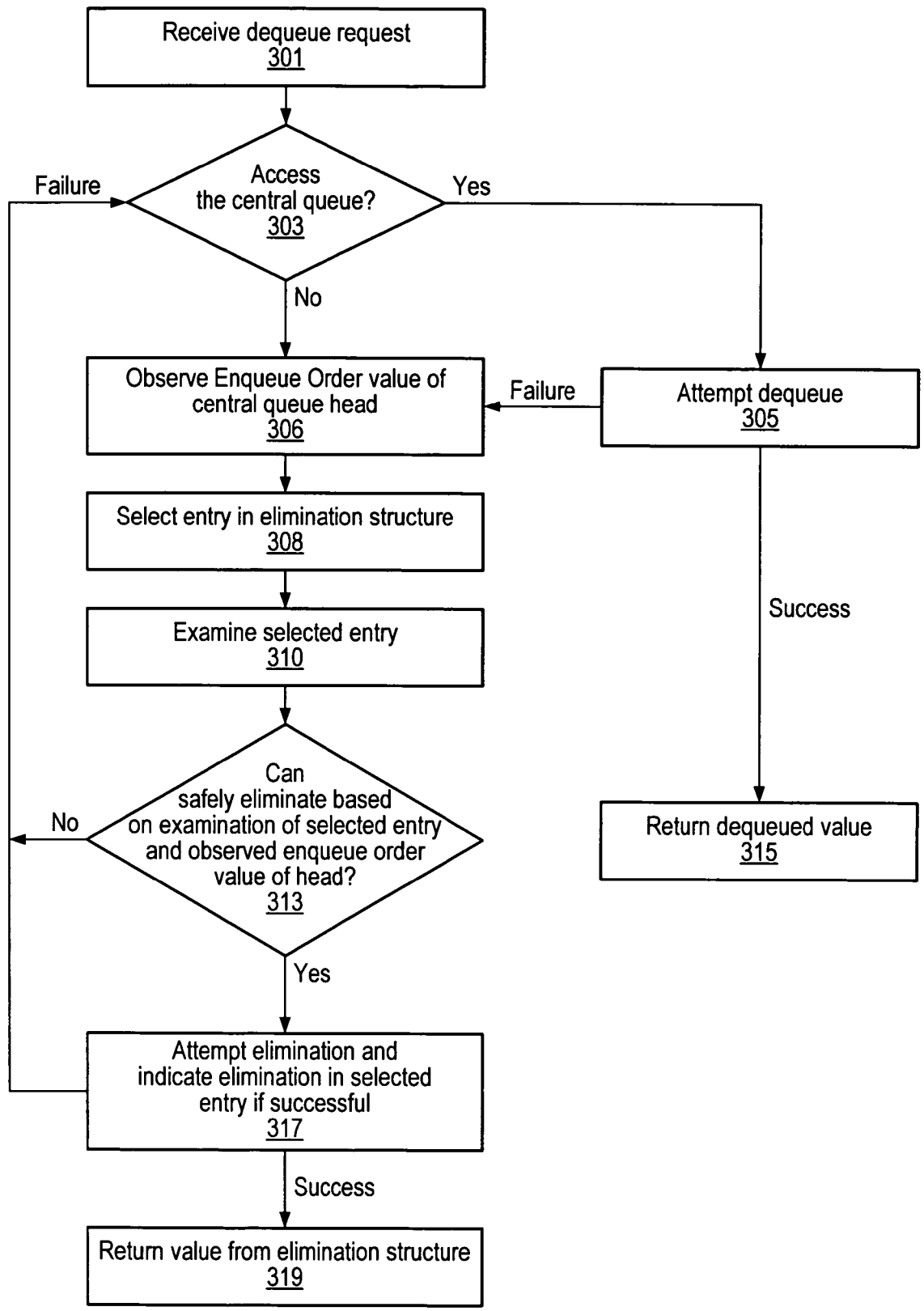
FIG. 3B depicts a flowchart illustrating one embodiment of a method for dequeuing on a lock-free scalable FIFO queue implementation.

FIG. 3B depicts an exemplary flowchart for a dequeue operation on a lock-free scalable FIFO queue implementation. At block 301, a dequeue request is received. At block 303, it is determined whether to access the central queue. If the central queue is to be accessed, then control flows to block 305. If the central queue is not to be accessed, then control flows to block 306.

At block 305, a dequeue attempt is made. If the dequeue attempt fails, then control flows to block 306. If the dequeue attempt is successful, then control flows to block 315. At block 315, the dequeued value is returned.

At block 306, the enqueue order value of the head node of the central queue is observed. At block 308, an entry in an elimination structure is selected (e.g., at random). At block 310, the selected entry is examined. For example, the entry is examined to determine the contents of the entry (e.g., whether the selected entry indicates EMPTY, DONE, or an enqueue operation). At block 313, it is determined whether it is safe to perform elimination based upon the examination of the selected entry and the observed enqueue order value of the central queue head. For example, the enqueue order value of the enqueue operation of the selected elimination entry is compared against the previously observed head enqueue order value. If it is not safe to perform elimination, then control flows back to block 303. If it is safe to perform elimination, then control flows to block 317. At block 317, an attempt is made to eliminate and elimination is indicated in the selected entry (e.g., with a DONE) if the elimination attempt is successful. Even if a corresponding enqueue operation is not in the elimination structure, or is not selected by the dequeue operation, then the elimination attempt can be an effective back-off technique. If the elimination attempt fails, then control flows back to block 303. If the elimination attempt is successful, then control flows to block 319. At block 319, the value from the selected elimination structure entry is returned. In addition, if the elimination is successful, the indication of the corresponding enqueue operation is cleared from the elimination structure.

In the described realizations of the elimination mechanism, an enqueue operation installs an entry in an elimination structure and a dequeue operation pairs up with an enqueue operation with the elimination structure for elimination of the pair of operations. However, realizations of the described invention may implement elimination differently. For example, dequeue operations may install entries in the elimination structure and enqueue operations perform the pairing and elimination, or either of enqueue or dequeue operations may install entries in the elimination structure while the counterpart operation pairs and eliminates.

While FIGS. 3A and 3B show particular orders of operations performed by certain embodiments of the invention, it should be understood that such order is exemplary only and that alternative embodiments may perform the operations in a different order, combine certain operations, overlap certain operations, perform certain operations in parallel, etc.

The following exemplary code illustrates an Enqueue operation that corresponds to the flowchart depicted in FIG. 3A.

```
enqueue (Q: pointer to Queue_t, value: data type)
1: uint seen_tail = PeekTail(Q)
2: Anode t node = new_node(value)
3: loop
4:    if DecideWhetherToAccessQueue( ) and
EnqueueAttempt(Q, node) then
5:        return
6:    else
7:        if TryToEliminateEnqueue(Q, node, seen_tail) then
8:            free(node)
9:            return
10:       end if
11:   end if
12: end loop
```

The following exemplary code illustrates a Dequeue operation that corresponds to the flowchart depicted in FIG. 3B.

```
dequeue(Q: pointer to Queue t, pvalue: pointer to data
type):boolean
1: loop
2:    if DecideWhetherToAccessQueue( ) then
3:        res = DequeueAttempt(Q, pvalue)
4:        if res == success then
5:            return true
6:        else if res == QUEUE_EMPTY then
7:            return false
8:        end if
9:    else
10:       if TryToEliminateDequeue(Q, pvalue) then
11:           return true
12:       end if
13:   end if
14:   Backoff( )
15: end loop
```

The Enqueue operation begins by determining the enqueue order value of the last element in the central queue (if any). This is needed to determine when it is safe to eliminate this Enqueue operation with a Dequeue operation. The Enqueue operation then allocates a node initialized with the value to be enqueued, and then repeatedly attempts either to enqueue the value using the central queue, or to find a Dequeue operation with which to eliminate, depending on guidance from the heuristic implemented by DecideWhetherToAccessQueue.

Figure 4:
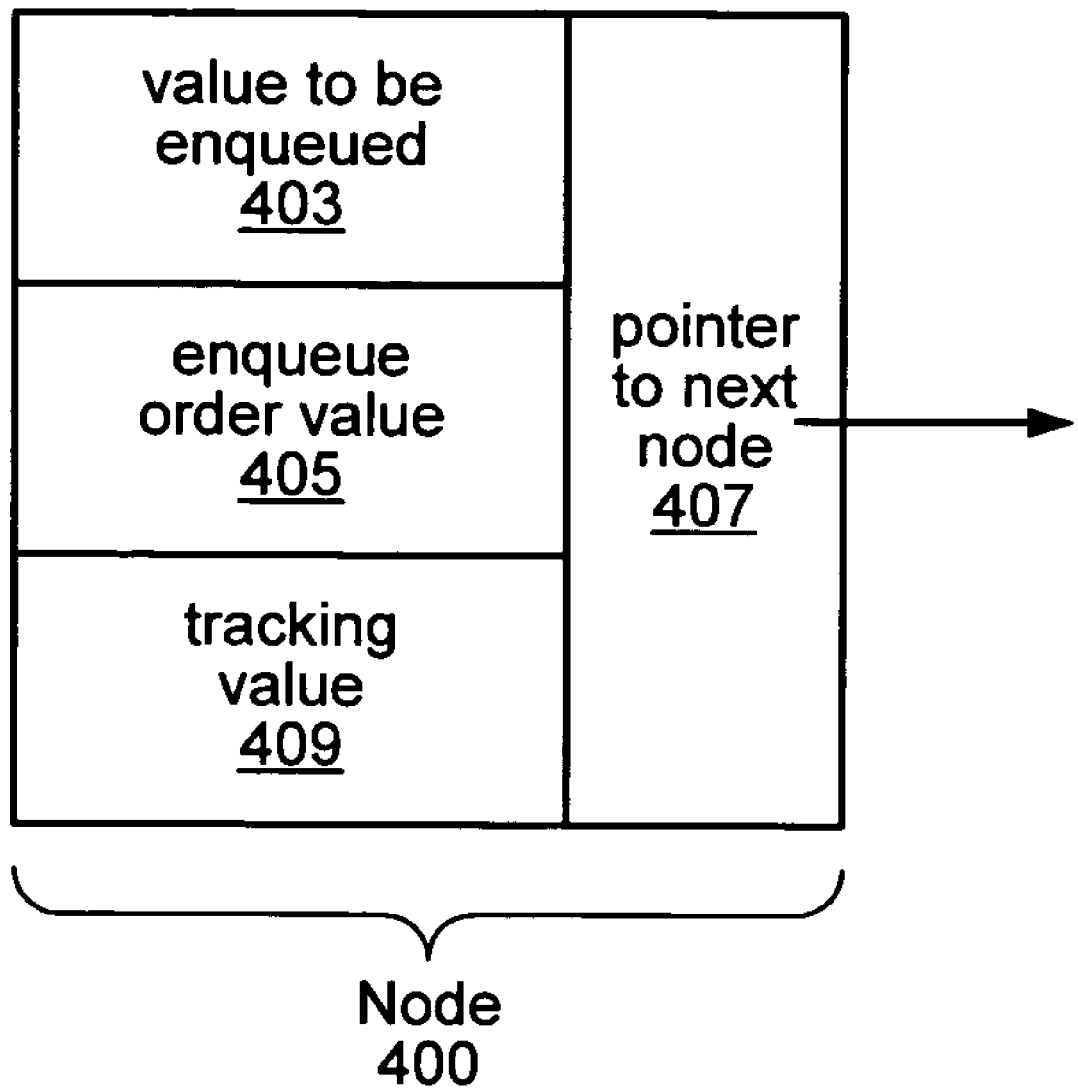
FIG. 4 depicts an exemplary node generated for enqueuing a value, according to one embodiment.

FIG. 4 depicts an exemplary node generated for enqueuing a value. A node 400 includes a value to be enqueued field 403, and enqueue order field 405, a tracking value field 409, and a pointer to next node field 407. The tracking value field 409 indicates a value that tracks information about the enqueue that is trying to eliminate (e.g., the enqueue order value of a previously enqueued value). In some realizations that utilize adaptations of the MS-queue, the node 400 serves two purposes. First, a reference to the node 400 is passed to EnqueueAttempt to communicate the value to be enqueued into the central queue. Depending on the central queue implementation, it may use the node in the central queue, and the node may include other fields not shown here or less fields. For example, the tracking value field 409 may be indicated elsewhere, such as with a data structure associated with the thread. The other purpose of the node 400 is for elimination. The value indicated in the value to be enqueued field 403 is the value to be passed from an eliminated enqueue operation to the corresponding eliminated dequeue operation (e.g. from a producer thread to a consumer thread), and the enqueue order value field 405 is used to determine when it is safe to eliminate an enqueue-dequeue operation pair. In some embodiments, "special" values are assumed: "EMPTY" and "DONE", which can be distinguished from "real" pointers to nodes. The special values chosen might be values that cannot be node addresses (for example due to alignment assumptions), or two nodes can be allocated and associated with the special values. The node illustrated in FIG. 4 is exemplary and may be implemented differently. For example, a node may include the field 403 and another field to host the enqueue order value and the tracking value at different times (e.g., the field hosts the enqueue order value while the node is associated with an elimination structure and the tracking value while in the central queue).

Finally we note that, in order to avoid the ABA problem, pointers in the collision array could be stored together with version numbers, which are incremented each time a node is installed into the collision array. This avoids the following potential ABA problem. A Dequeue could read a pointer from the collision array and determine that the Enqueue is safe to eliminate. However, before the Dequeue performs its CAS to "claim" the value to return, the node could be removed from the collision array, recycled, and reused in the collision array by another Enqueue operation that is not yet safe to eliminate. In some embodiments, version numbers may be used to prevent this from occurring. Additional techniques, such as the bounded timestamps technique described in *Practical Implementations of Non-blocking Synchronization Primitives* in *Proceedings of the 16th Annual ACM Symposium on Principles of Distributed Computing*, pages 219-228 (1997) by Mark Moir, the memory management technique described in U.S. patent application Ser. No. 10/340,156 entitled "VALUE RECYCLING FACILITY FOR MULTITHREADED COMPUTATIONS," naming as inventors Mark S. Moir, Victor Luchango and Maurice Herlihy.

In the exemplary code, the central queue provides operations EnqueueAttempt and DequeueAttempt. These operations provide the same semantics as the standard enqueue and dequeue, except that they are allowed to return a special value indicating that they failed to complete their operation on the queue because of conflicts with other operations. The Enqueue operation returns when it succeeds using either enqueueing or eliminating. In the case that it succeeds by elimination, it frees the node it used to eliminate; otherwise, we assume that the central queue manages the node. The structure of a Dequeue operation is similar.

The Dequeue operation begins by determining whether to access the central queues with guidance from DecidewhetherToAccessQueue. If the Dequeue operation should access the central queue as guided by the heuristic, then it attempts to dequeue the value. Otherwise, the Dequeue operation attempts to eliminate a corresponding Enqueue operation.

An exemplary elimination mechanism is implemented with TryToEliminateEnqueue and TryToEliminateDequeue, exemplary code for which is indicated below.

```
TryToEliminateEnqueue (Q: pointer to Queue_t, node: pnode t, seen_tail;
                      uint) :boolean
1: node->seq = seen tail;
2: i = random(collision_array_size)
3: <colnode,ver> = Q->Collisions[i] 4: if colnode == EMPTY then
5:     if CAS (&Q->Collisions[i] , <EMPTY,ver>, <node,ver+1>) then
6:        ShortDelay()
7:        colnode = Q->Collisions[i].node
8:        if (colnode == DONE) or (not CAS (&Q->Collisions[i],
<colnode,ver>, <EMPTY, ver>)) then
9:           Q->Collisions[i] = <EMPTY,ver>
10:          return true
11:       end if
12:    end if
13: end if
14: return false
TryToEliminateDequeue(Q: pointer to Queue t, pvalue: pointer to data
type) :boolean
1: seen head = PeekHead(Q)
2: i = random(collision array size)
3: <node,ver> = Q->Collisions[i]
4: if node does not include {EMPTY, DONE} then
5:     if node->seq < seen_ head then
6:        *pvalue = node->value
7:        if CAS (&Q->Collisions[I] , <node, ver>, <DONE, ver>) then
8:           return true
9:        end if
10:    end if
11: end if
12: return false
```

As presented, the enqueue procedure calls PeekHead and provides the results for use by TryToEliminateEnqueue. The TryToEliminateDequeue procedure calls PeekTail. The queue associates monotonically increasing "enqueue order values" with values enqueued. In addition, the PeekHead and PeekTail operations provide access to these enqueue order values. When the queue is not empty, PeekHead returns the enqueue order value of the element at the head of the queue (the next one to be dequeued), and PeekTail returns the enqueue order value of the element at the tail of the queue (the one most recently enqueued). If the queue is empty, these operations can return some value that can be distinguished from enqueue order values. For convenience, PeekTail can return 0 and PeekHead can return ∞ when the queue is empty, but other variations are possible. Using these special values avoids treating the empty queue as a special case.

If the central queue is implemented as an adaptation of the MS-queue, PeekHead and PeekTail are straightforward to implement. PeekHead reads the Head pointer, and then returns an enqueue order value from the node it points to, plus 1. Recall that the first node may be a dummy node, so the first element in the queue is the second node in the queue, which by construction has a enqueue order value that is 1 greater than the enqueue order value of the first node. PeekHead must also detect when the queue is empty, and return the associated special value. It can achieve this by reading the next pointer of the first node; if it is null, when the queue is empty. PeekHead also uses standard techniques to detect interference from concurrent operations in retry. Generally, this involves rereading the Head pointer to ensure that it did not change while the contents of the node were being read.

The PeekTail operation is similarly straightforward, with one exception. It reads the Tail pointer and returns the enqueue order value of the last node in the queue. However, recall that in the MS-queue algorithm, the tail can sometimes "lag" the end of the queue by one node, so PeekTail 1 may have to perform the "helping" in the MS-queue algorithm in order to be sure that it obtains the enqueue order value of the most recently enqueued element. Also, PeekTail detects the queue being empty by reading both the head and the tail, and if they are the same, returning the appropriate special value to indicate emptiness. Standard lock-free techniques are used to detect interference from concurrent operations and retrial. Note that even if the DecidewhetherToAccessQueue heuristic always tells all threads not to access the central queue (because load is high, so we should encourage elimination, for example), the threads still invoke the PeekTail and PeekHead operations. Thus, care should be taken to ensure that frequent access to these operations does not impede performance. In realizations with MS-queue-based implementations, these operations are read-only, and therefore do not result in cache misses that would inhibit scalability.

TryToEliminateEnqueue stores the enqueue order value of the last element in the queue (determined from PeekTail) in seen.tail, and then attempts to find an empty location in the collision array to use for a collision. It does this by choosing a location at random, and then determining if the location contains EMPTY. If not, the elimination attempt fails. Otherwise, the thread attempts to replace the EMPTY value with a pointer to its node using compare-and-swap (CAS). If this CAS fails, then the elimination attempt fails. Otherwise, the Enqueue has installed its node into the collision array, so it waits for a short time, hoping that a Dequeue that is attempting to eliminate finds the node and eliminates. If it does so, the Dequeue operation changes the node pointer to DONE, as explained below. Thus, when the Enqueue operation has finished waiting, it checks to see if the node pointer has been changed to DONE. If so, the operation has been eliminated, so it can return successfully. Otherwise, the thread uses CAS to attempt to change its entry in the collision array back to EMPTY, so that it can return to the main Enqueue procedure to retry. If this CAS fails, it can only be because a Dequeue operation has changed the node to DONE, so again the Enqueue is successfully eliminated in this case.

When a Dequeue operation attempts to eliminate, it chooses a location in the collision array at random, and checks to see if there is an enqueue waiting to eliminate at that location (if the node pointer is not DONE or EMPTY, then there is an elimination attempt in progress by an Enqueue operation). If an Enqueue is not waiting at the selected location, then the attempt to eliminate fails. Otherwise, the Dequeue can attempt to change the node pointer to DONE, indicating to that Enqueue operation that the elimination was successful. If the Dequeue operation successfully changes the node pointer to DONE, then it simply returns the value from the node. However, as discussed earlier, it is not always safe to eliminate with an Enqueue operation. The Dequeue operation that hopes to eliminate must first confirm that the enqueue order value associated with the element at the head of the central queue is greater than the enqueue order value that was associated with the element at the tail of the central queue when the candidate Enqueue operation began. This is necessary to ensure linearizability, because the eliminated Enqueue operation should be ordered immediately before the Enqueue operation that enqueued the element at the Head of the queue when the elimination occurs. To satisfy the conditions for linearizability, it ensures that the eliminated Enqueue operation has already been invoked by that point. If the eliminated Enqueue operation was not invoked before that point, then the elimination fails. A Dequeue operation seeking to eliminate might check multiple collision entries if it does not find an Enqueue operation with which to eliminate on its first attempt. In particular, once an entry has been checked, it is very cheap to also check other entries in the same cache line.

While realizations of the central queue have been described with reference to the MS-queue technique, various alternative queue implementations can be used. Generally, the FIFO queue implementation should be lock-free in the following sense: if some operation takes a sufficient number of steps, then some operation completes successfully (an EnqueueAttempt or DequeueAttempt is successful if it does not return the special failure value). Furthermore, the EnqueueAttempt and DequeueAttempt operations should be wait-free: they should complete (either successfully or not) in a bounded number of their own steps. These two characteristics prevent livelock on the central queue, and also allow intervention and use of the elimination in the case that an operation on the central queue does not complete successfully.

Adaptation of the MS-queue involves modification of EnqueueAttempt and DequeueAttempt operations. The EnqueueAttempt and DequeueAttempt operations are modified by taking one iteration of the retry loop in the corresponding operation of the MS-queue algorithm. Further, in order to facilitate the PeekHead and PeekTail operations, each successful EnqueueAttempt operation associates an enqueue order value with the enqueue value, as follows. Each enqueued node contains an enqueue order value, which is derived by adding 1 to the value in the node pointed to by tail immediately before the new node is installed. It is straightforward for one skilled in the art to make this adaptation. The MS-queue algorithm always contains at least 1 queue node, even when it is empty, so the enqueue order value of the most recently enqueued element is always available. Hence, the enqueue order value can be derived for a new element that is being enqueued.

Operations for the lock-free, scalable FIFO queue can be completed either by a successful attempt on the central queue, or by elimination. Under high load, elimination is preferable, because accessing the non-scalable central queue will result in poor performance. On the other hand, under low load, finding an eligible operation with which to eliminate may take too long, and because load is low, accessing the central queue should be fast. Linearizability can be achieved with an arbitrary mix of eliminated and noneliminated operations. Thus, a thread can choose dynamically between accessing the central queue and attempting to eliminate. In either case, if the attempt is unsuccessful, the other method can be tried. In the case of very low load, it may be necessary to access the central queue in order to complete an operation. A variety of strategies for attempting operations and adapting to load are possible. The scope of the described invention is not limited to a single strategy. Therefore, the exemplary code assumes a function DecideWhetherToAccessQueue, which returns true if an attempt should be made to complete the operation by accessing the central queue, and false if an attempt should be made to try to eliminate. This function can implement any heuristic choice of which method to attempt in each iteration. However, the following points should be noted:

The heuristic should be inexpensive to evaluate, and should not synchronize on centralized data.

The heuristic should always eventually attempt to complete on the central queue in order to ensure lock-freedom.

The heuristic should avoid attempting to complete operations on the central queue frequently under high load, as the non-scalable nature of the central queue will cause performance to degrade in this case.

A variety of possible heuristic approaches will be apparent to one skilled in the art. For example, one strategy is to simply use the elimination approach as a backoff strategy: whenever an attempt on the central queue fails, elimination is attempted for some time before retrying on the central queue.

The embodiments described above assume unbounded enqueue order values. However, bounded enqueue order values, such as 64-bit enqueue order values, can be utilized without exhausting the enqueue order values in the lifetime of a typical system. Since nodes are not visible to other threads while they are being initialized, it is straightforward to implement lock-free counters of arbitrary length. Bounded timestamps can also be used, if applicable, because we only compare enqueue order values.

Similarly, version numbers are bounded and could in principle cause incorrect behavior. A variety of techniques for ensuring such behavior does not occur in practice are known in the literature, including a) using sufficient bits for the version number that wraparound cannot cause an error in practice, b) using bounded tags, and c) using memory management techniques to ensure that a node is not prematurely recycled in such a way that it can allow the ABA problem. While these other techniques (bounded tags, memory management) are useful for solving the ABA problem (as discussed above), they are not useful for ordered values, because they do not support a comparison operation.

Figure 5:
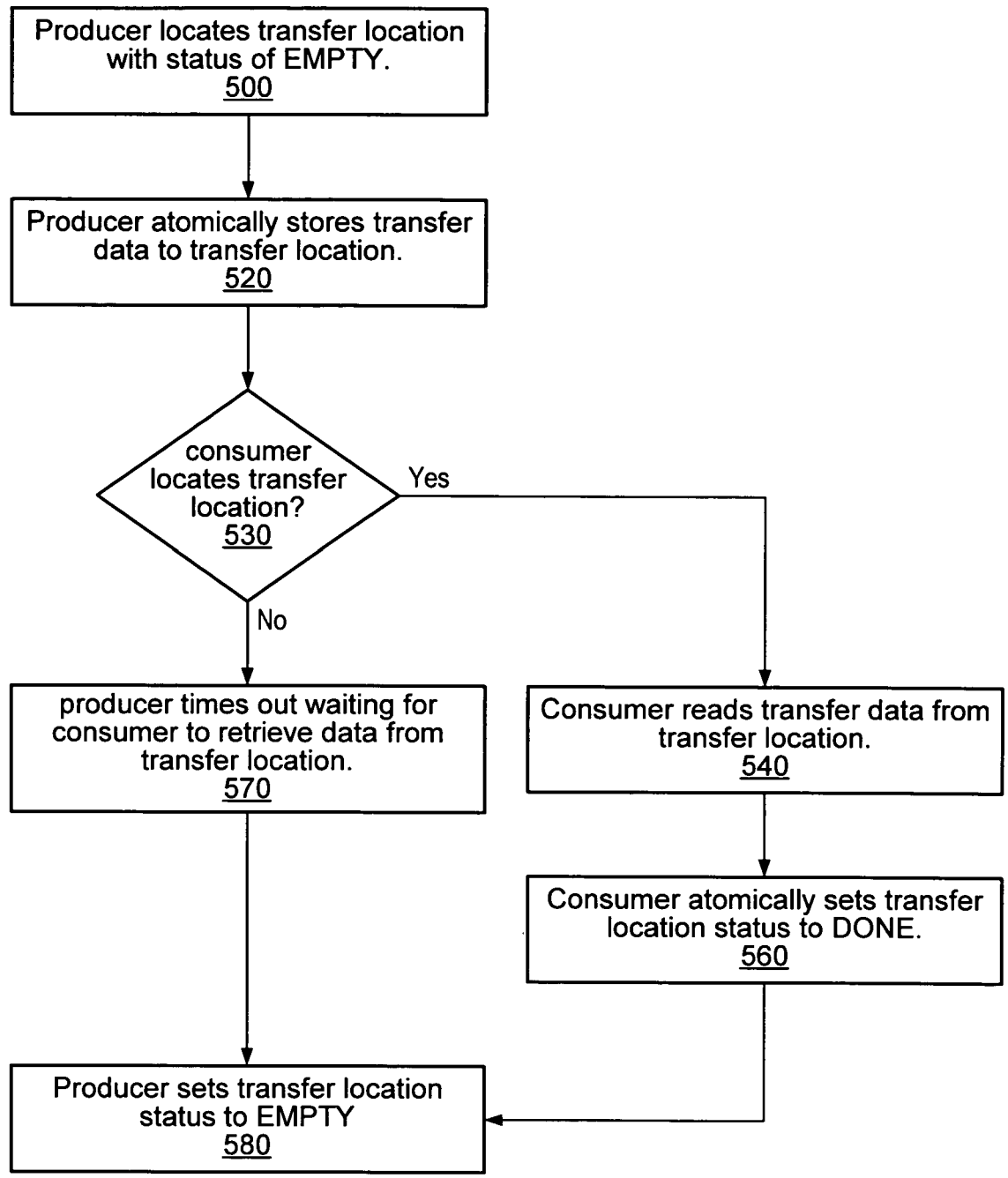
FIG. 5 is a flowchart illustrating one embodiment of a method for producer and consumer elimination, as described herein.

FIG. 5 is a flowchart illustrating one embodiment of a method for producer and a consumer elimination to transfer data from the producer to the consumer, as described herein. As described above, a producer, such as producer thread 103, selects a transfer location that indicates a status of empty, as illustrated by block 500. For instance, a producer may encounter an error or collision when attempting to store data to a central data structure, such as a stack or FIFO queue and therefore attempt to use an elimination pool or array. Various methods may be used to locate an empty transfer location. In one embodiment, the producer may randomly select an entry in a transfer pool or elimination array and may check to see whether or not that entry has a status of EMPTY. As noted above, in some embodiments, the status of a transfer location may be indicated by special, predetermined, and/or pre-defined values that may not be valid values for transfer data. Such predefined status indicators may be stored in the transfer location in the same byte or bytes used to store transfer data. In other embodiments, other manners to indicate the status of a transfer location may be used, such as by storing the status in a separate, reserved location within the transfer location. As illustrated by block 520, producer thread 103 may atomically store a transfer data value to the transfer location. For instance, as described above, the producer may use a compare-and-swap (CAS) operation or command that is configured to guarantee the atomicity of the operation and to ensure that the value in the transfer location is an expected value, such as EMPTY status indicator, before storing the new value to the transfer location. The use of CAS, or similar, operations may ensure that two processes don't both attempt to use the same transfer location at the same time and corrupt each other's data.

A consumer may then discover the transfer location, as indicated by the positive output from decision block 530 and read the data from it, as illustrated by block 540, according to some embodiments. For example, a consumer that is ready to retrieve data may randomly access a transfer location 130 and determine whether it contains data ready to be consumed. In some embodiments, the consumer may verify that the location contains transfer data by checking the transfer location's status. As noted above, in one embodiment, a location's status may be stored in the same location as transfer data. Thus, in some embodiments, a consumer may read the value of a selected transfer location and then compare the value with predetermined status values, such as EMPTY or DONE to determine whether or not the location contains valid transfer data. If the transfer location contains valid transfer location, the consumer, after reading the data from the location (if it did not already do so to check the location's status) may then set the location's status to DONE, as illustrated by block 560, indicating that the transfer data has been successfully retrieved.

A producer may, in some embodiments, monitor the transfer location in order to know when, and if, a consumer picks up the transfer data. For instance, the producer may timeout if a consumer has not read the transfer data and set the location's status to DONE before a specified length of time, as indicated by block 570. As the concept and use of timing out and timeout values is well understood in the art, they will not be discussed in detail herein. After detecting that a consumer has set the location's status to DONE or after timing out, the producer may set the transfer location's status to EMPTY, as illustrated by block 580. By actively setting the transfer location's status back to EMPTY, the producer ensures that the location is available for future transfers. In some embodiments, when setting the transfer location's status to EMPTY, the producer may or may not use a CAS operation depending upon whether or not a consumer has successfully retrieved the data from the transfer location. For instance, if a consumer did successfully retrieve the data from the data location, the producer may not need to use a CAS operation because no other process should be attempting to access the transfer location. No other producer process or thread may attempt to store anything to that transfer location because the transfer location's status is not EMPTY. No consumers should attempt to store anything to that transfer location because the location's status is DONE, indicating that location does not currently hold data ready to be retrieved. If, however, a consumer did not successfully retrieve the data from the transfer location and the producer times out and then resets the transfer location's status to EMPTY, the producer may use a CAS, or similar, operation. For instance, in some embodiments, the producer may use a CAS operation to reset a transfer location's status to EMPTY after timing out in order to avoid the consumer retrieving the data from the transfer location and attempting to set the transfer location's status to DONE at the same time. If a producer times out and attempts to reset a transfer location's status to EMPTY at the same time that a consumer reads the data and attempts to set the transfer location's status to DONE, one of the CAS operations will fail.

Figure 6:
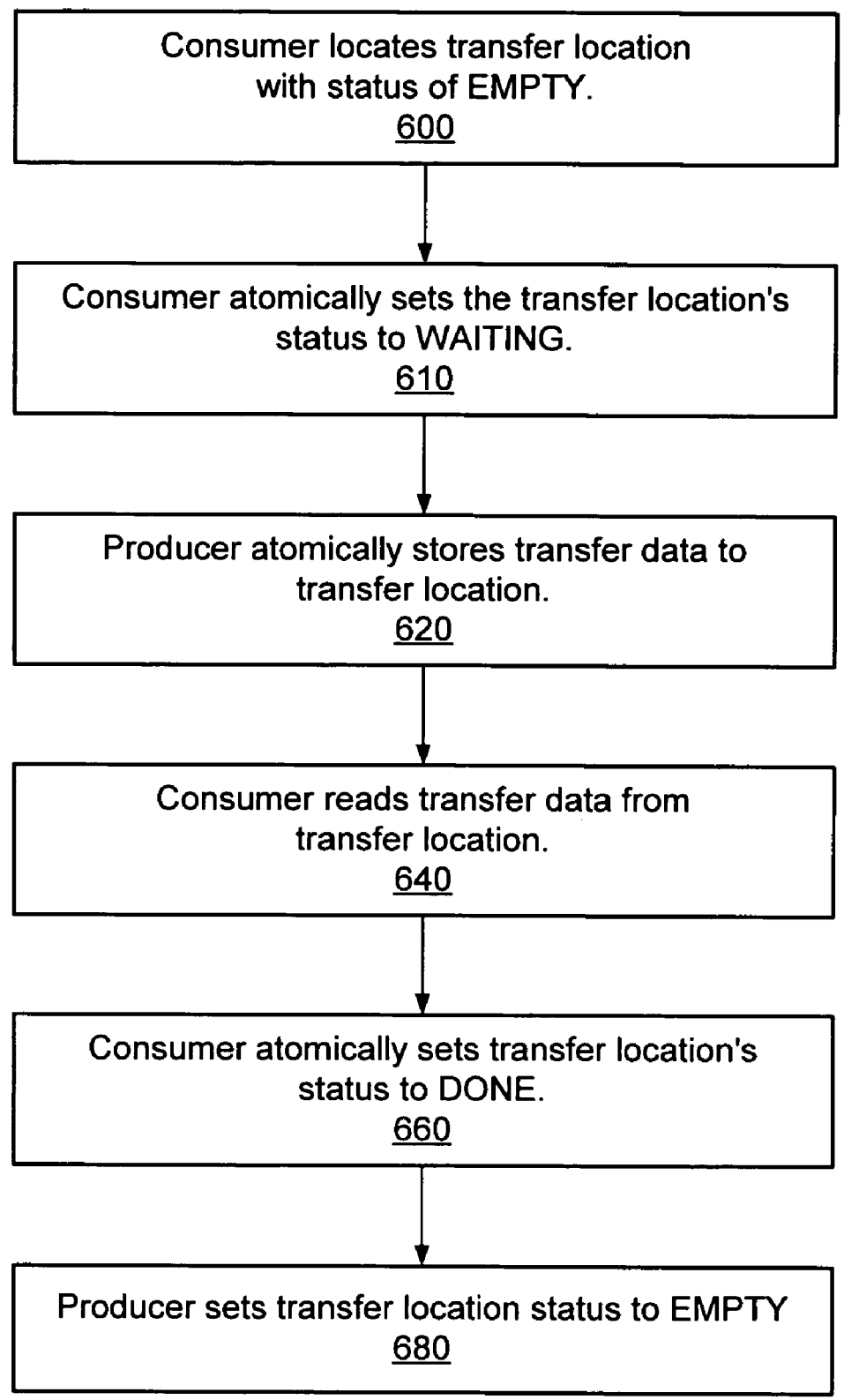
FIG. 6 is a flowchart illustrating one embodiment of a method for consumer-initiated producer and consumer elimination.

Producer and consumer elimination is described above with the producer initiating the transfer of data, such as by storing a data value to a transfer location and thus changing the location's status to something other than EMPTY. In some embodiments, however, consumers may initiate or request a transfer of data. FIG. 6 is a flowchart illustrating one embodiment of a method for consumer-initiated elimination between a producer and a consumer. As illustrated by block 600, a consumer wishing to retrieve or pick up data from a producer may find a transfer location with a status of EMPTY, indicating it is available for use. The consumer may then set the transfer location to WAITING, or to some other predetermined value indicating that a consumer is waiting for data to be put into this particular location by a producer, as illustrated by block 610. In some embodiments, the consumer may use a CAS operation when setting a transfer location's status to WAITING to prevent another process, either producer or consumer, from accessing the transfer location at the same time. The consumer may then wait for a producer to atomically store transfer data in the transfer location, as illustrated by block 620. As noted above, the producer may use a CAS operation to store a data value to the transfer location in order to prevent another producer from also attempting to use the same transfer location at the same time. The consumer may monitor the status of the location by comparing the value in the location to the WAITING value. Such monitoring may occur periodically until some predetermined length of time (a timeout value) or a consumer may constantly monitor the location until the data is placed there by the producer.

The following sample code illustrates one embodiment of consumer-initiated elimination implementation, as described herein.

```
// Note EMPTY and WAITING are special and are
// not included in the "value" type).
elim_type = {EMPTY, WAITING} union value
shared X: elim_type initially EMPTY
bool ProducerAttempt(v:value)
{
    return (CAS(&X, WAITING, v));
}
<bool, value> ConsumerAttempt( )
{
    if (!CAS(&X, EMPTY, WAITING)) {
        return <false, ?>;         // ? indicates "don't care")
    }
    shortdelay( );
    prev = CASval(&X, WAITING, EMPTY);
    if (prev == WAITING) {
        return <false, ?>;
```

-continued

```
   }
   X = EMPTY;
   return <true, prev>;
}
```

When the consumer thread 105 determines that the value in the transfer location has been changed from WAITING to some value other than WAITING, EMPTY, or DONE (or some other status indicator), the consumer may then read the data from the transfer location, as illustrated by block 640. The consumer may also set the transfer location's status to DONE, as illustrated by block 660. As described above, a consumer thread 105 may use a CAS operation to set the transfer location's status to DONE to prevent simultaneous access by another process, such as the producer thread 103 having timed out and attempting to reset the status of the transfer location to EMPTY. As described above, the producer may determine that the consumer has successfully retrieved the data from the transfer location, as indicated by the transfer location's DONE status, and may reset the transfer location's status to EMPTY, as indicated by block 680. As also described above, when resetting a transfer location's status back to EMPTY, the producer may not use a CAS operation unless the producer timed out without a consumer retrieving the data from the transfer location, in which case a CAS operation may be used.

While FIGS. 5 and 6 show particular orders of operations performed by certain embodiments of the invention, it should be understood that such order is exemplary only and that alternative embodiments may perform the operations in a different order, combine certain operations, overlap certain operations, perform certain operations in parallel, etc.

In some embodiments, a consumer that has initiated a transfer by setting a transfer location's status to WAITING may time out waiting for a producer to store data to be transferred in the transfer location. Similarly to a producer that times out waiting for a consumer to retrieve data, a consumer that times out when waiting for a producer to store data may cancel the transfer by resetting the transfer location's status to EMPTY. In some embodiments, a consumer may reset a transfer location's status to EMPTY using a CAS operation to ensure that no other process or thread accesses the same transfer location as the same time. For instance, a producer may attempt to store a data value to be transferred to the transfer location after the consumer has timed out and at the same time that the consumer attempts to reset the transfer location's status back to EMPTY. After timing out while waiting for a producer to store data in a transfer location, a waiting consumer may retry the transfer may setting another location to WAITING, or may take some other error notification or correction actions, according to various embodiments.

Figure 7A:
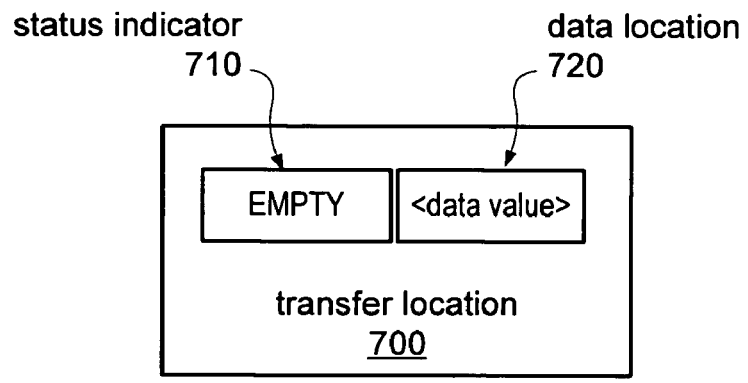
FIGS. 7A, 7B and 7C are block diagrams illustrating exemplary formats for a transfer location, according to various embodiments.

In some embodiments, the values used for indicating the status of a transfer location (such as EMPTY, WAITING and/or DONE) can be any predetermined or prearranged values that will not otherwise occur in the data to be transferred. In embodiments and/or applications where any data value can occur in the transferred data, transfer locations may include a special location, such as an extra byte that may be used only to indicate the transfer location's status, as illustrated by FIG. 7A. In a simple example, a producer and consumer may exchange one byte of information, but any byte value may be valid for transfer. The producer and consumer may use a transfer location of two bytes in size. One of the two bytes, say the first byte may be used to store status indicators to indicate the current status of the transfer location. For instance, as illustrated in FIG. 7A according to one embodiment, transfer location 700 may include status indicator 710, which may store various status indicator values, such as EMPTY, WAITING, DONE, etc, and may also include data location 720 used to store the actual data to be transferred between a producer and a consumer. In such an example, a producer thread 103 may find a transfer location whose status indicator is set to EMPTY and may store data to be transferred to another address in the transfer location, such as to data location 720. As described above, the producer may also set the transfer location's status to a status other than EMPTY, indicating that the data in the second byte of the location is ready to be picked up by the consumer. The consumer may then read the data from the transfer location and set the transfer location's status indicator 710 to DONE, signaling the producer that the data has been successfully retrieved.

Figure 7B:
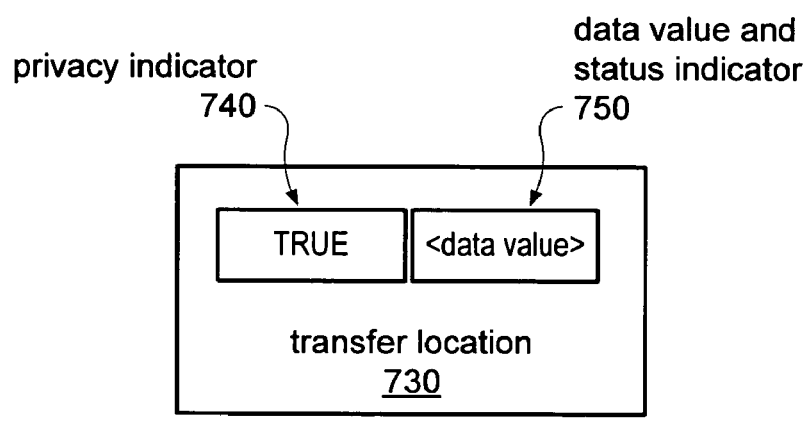

In some embodiments, as noted above, either a producer or a consumer can initiate a transfer. As describe above, a consumer may initiate a transfer by setting the status of a transfer location to WAITING. However, in embodiments where both producers and consumers can initiate a transfer a need may arise to distinguish between a value in a transfer location that is put there for a particular consumer, such as when a consumer initiates a transfer by storing a WAITING value in the transfer location, from transfer data stored for any consumer to retrieve. In some embodiments, an additional Boolean value, called a privacy indicator herein, may be used to distinguish between transfer values for particular consumers and transfer values for any consumer. FIG. 7B illustrates a transfer location including a privacy indicator, according to one embodiment. For instance, as illustrated in FIG. 7B, transfer location 730 includes privacy indicator 740 as well as a data value and status indicator 750. According to one embodiment, data value and status indicator 750 may be used to store both data values to be transferred and to indicate a current status for transfer location 730, such as EMPTY, DONE and/or WAITING. Transfer location 730 also includes privacy indicator 740 for storing a Boolean value indicating whether a particular data value is for a specific consumer, such as a waiting consumer that initiated elimination, or for any consumer. For example, if a producer is placing a transfer value in a transfer location for any consumer to pick up, the producer may also store a FALSE value in privacy indicator 740, thus indicating that any consumer may pick up that particular value from the transfer location. Conversely, if a consumer initiated a transfer by setting the transfer location's status to WAITING, a producer responding to the consumer-initiated transfer may put a transfer value in the transfer location and also set privacy indicator 740 to TRUE, indicating to other consumers that this value is only for the consumer that initiated the transfer.

The following sample code illustrates one embodiment of an elimination implementation in which either a producer or a consumer may initiate the elimination, as described herein.

```
// Note EMPTY, DONE, and WAITING are special and are
// not included in the "value" type).
elim_type = {EMPTY, WAITING, DONE} union <value, boolean>
shared X: elim_type initially EMPTY
bool ProducerAttempt(v:value)
{
    elim_type x = X;
    if (x == DONE) {
        return false;
    } else if (x == EMPTY) {
        if (!CAS(&X, EMPTY, <v, false>)) {
```

-continued

```
        return false;
    }
    shortdelay( );
    if (X == DONE || !CAS(&X, <v, false>, EMPTY)) {
        X = EMPTY;
        return true;
    }
    return false;
} else if (x == WAITING) {
    return CAS(&X, WAITING, <v, true>);
} else {
    return false;
}
}
<bool, value> ConsumerAttempt( )
{
    elim_type x = X;
    if (x == DONE || x == WAITING) {
        return false;
    } else if (x == EMPTY) {
        if (!CAS(&X, EMPTY, WAITING)) {
            return <false, ?>;         // ? indicates "don't care")
        }
        shortdelay( );
        prev = CASval(X, WAITING, EMPTY);
        if (prev == WAITING) {
            return <false, ?>;
        }
        X = EMPTY;
        return <true, prev>;
    } else if (x == <v, false>) {  // for some value v
        if (CAS(&X, <v, false>, DONE)) {
            return <true, v>;
        } else {
            return <false, ?>;
        }
    } else {
        return <false, ?>;
    }
}
```

Figure 7C:
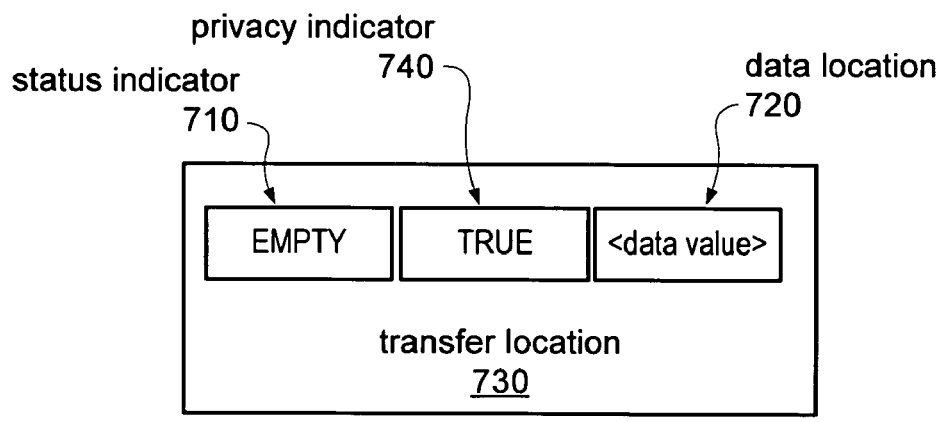

In certain embodiments, transfer locations may include separate address locations or areas for storing data values, status indicators and privacy indicators separately, as illustrated by FIG. 7C. For instance, in some embodiments, both producers and consumers may be configured to initiate transfers and therefore a transfer location 730 may include a separate privacy indicator 740 to allow producers to indicate whether a data value in a transfer location is intended for a particular consumer. Additionally, a separate status indicator may be required because data to be transferred may be able to include any possible value. Thus, as illustrated in FIG. 7C, a transfer location may be configured to store status indicators, privacy indicators and data values separately.

Figure 8A:
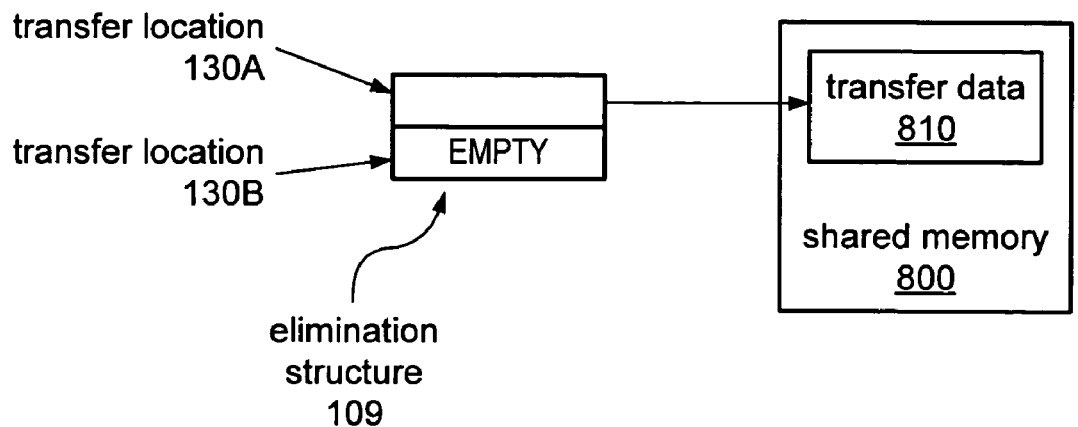
FIGS. 8A and 8B are block diagrams illustrating the use of pointers in transfer locations as part of producer and consumer elimination, in one embodiment.

In some embodiments, the size and amount of data transferred from a producer to a consumer may be larger than can be transferred using a CAS, or similar, operation. In certain embodiments, introducing a level of indirection may allow producers and consumers to exchange data according to the present invention. FIG. 8A illustrates the use of pointers in transfer locations, according to some embodiments. For example, instead of storing the actual data value in a transfer location, a producer may store a pointer to another block of shared memory to which the transfer data has been stored. For instance, as illustrated in FIG. 8A, transfer location 130A may store a pointer to transfer data 810 stored in shared memory 800. Various methods of indicating the status of a storage location when using indirection may also be used, according to different embodiments. For example, in one embodiment, one storage location, such as transfer location 130A, may hold a pointer to transfer data, while another transfer location, such as transfer location 130B, may hold a status indicator, such as EMPTY. In some embodiments, pointers to transfer data may always point to memory that is suitably aligned, such as on a word or double-word boundary, that predefined status indicators, such as EMPTY, DONE or WAITING can be easily distinguished from pointers to transfer data. For example, some of the low order bits of the pointer may be "stolen" for use as status indicating bits, according to one embodiment. In one embodiment, the two low-order bits of a pointer may be used as a 4 value status flag. For example, a value of 0x01 in the two-low order bits may represent an empty transfer location. Additionally, a null pointer may also be used to indicate an empty transfer location in some embodiments. A value of 0x11 may indicate that a transfer value is currently stored in another section of memory pointed to by the pointer, with the necessary corrections to the pointer due to the stolen two bits of status information.

Figure 8B:
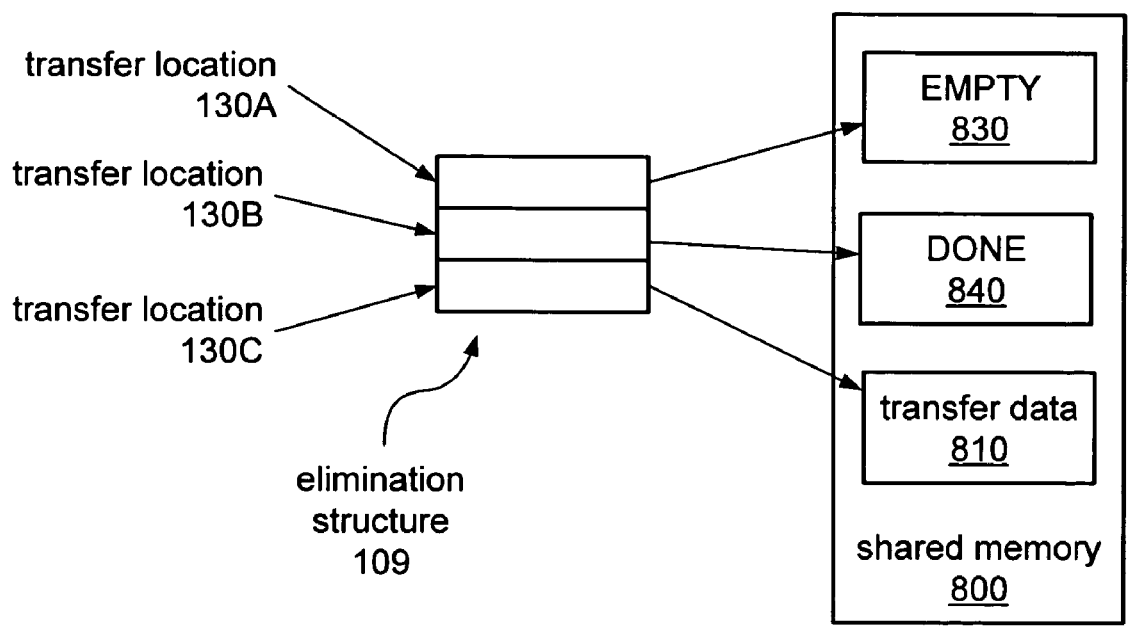

Alternatively, in other embodiments, special memory locations may be allocated and reserved for use as indicating the status of transfer locations. For instance, in some embodiments, all producers and consumer may be able to recognize that pointers stored in transfer locations may point to a predefined memory area indicating the status of the transfer location, such as EMPTY, DONE, WAITING, etc. FIG. 8B illustrates the use of dedicated memory locations representing status indicators for transfer locations. For example, shared memory 800 may include dedicated memory locations representing status indicators, such as EMPTY status 830 and DONE status 840. Various methods may be utilized to configure memory locations for use as status indicators. In some embodiments, the address of the EMPTY status 830 and DONE status 840 may be used by producers and consumer to recognize pointers to EMPTY status 830 and DONE status 640 as representing status indicators rather that pointers to valid transfer data. In one embodiment, the actual pointer values and addresses of the memory locations may be reserved and all producers and consumers may be configured to recognize those pointer values and/or memory addresses and indicative of a transfer locations status. Thus, transfer location 130A in FIG. 6B may hold a pointer to EMPTY status 830, indicating that transfer location 130A is available for use, transfer location 130B may store a pointer to DONE status 840 indicating a successfully completed data transfer, while transfer location 130C may hold a pointer to transfer data 810 holding data to be transferred.

In some embodiments, pointers and indirection may be used in transfer location because a producer may need to transfer more data than can be stored using a CAS, or similar operation. In embodiments where indirection is used, a pointer in a transfer location may point to a shared memory location than includes separate storage locations for both status indicators and data to be transferred, such as status indicator 710 and data location 720, described above regarding FIGS. 7A and 7C. Additionally, in some embodiments, a pointer in a transfer location may point to a shared memory addressing containing a separate storage location for a privacy indicator, such as privacy indicator 740, described above regarding FIGS. 7B and 7C.

Figure 9:
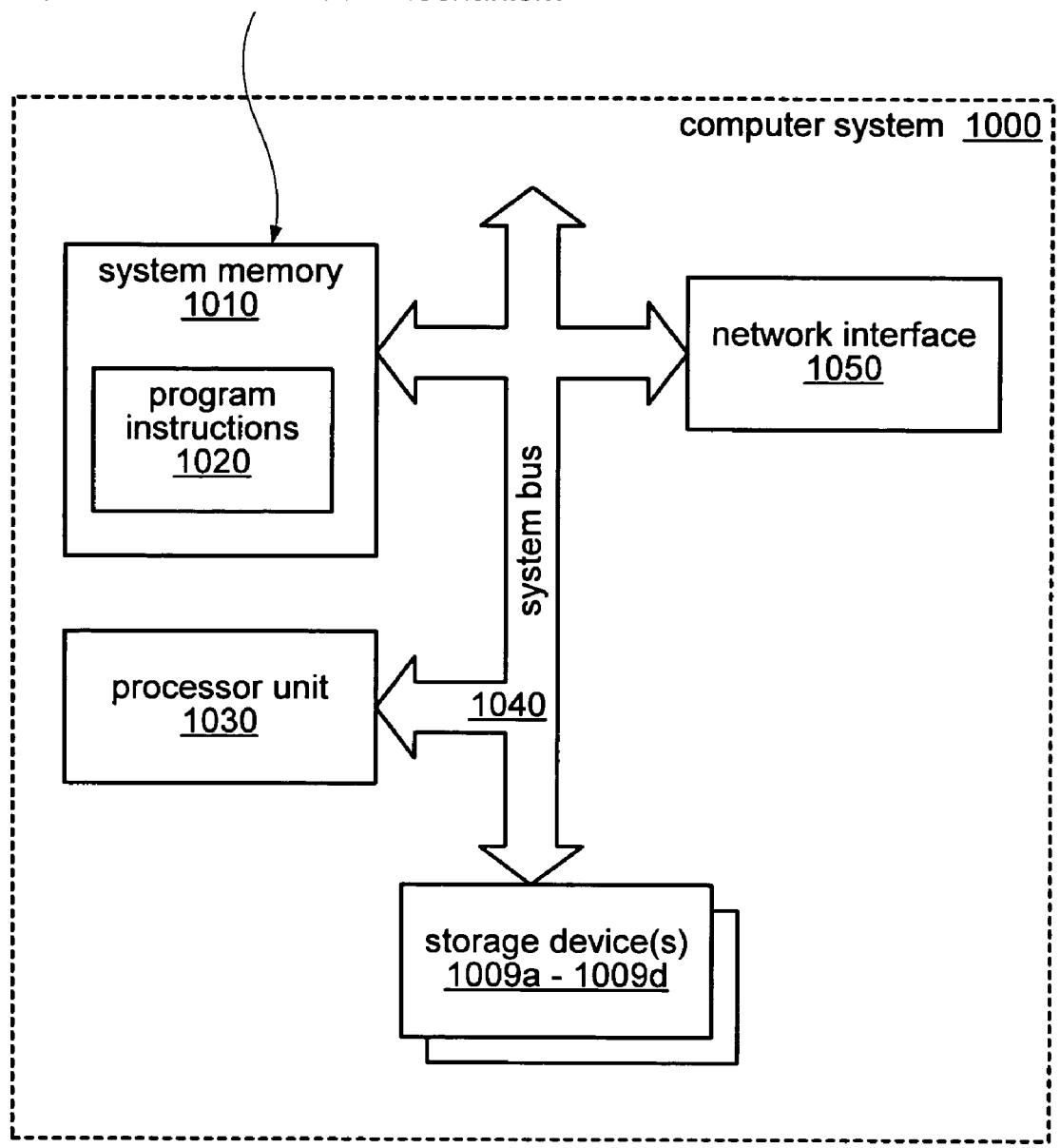
FIG. 9 is a block diagram illustrating an exemplary computer system capable of implementing producer and consumer elimination, as described herein.

FIG. 9 illustrates a computing system capable of implementing producer and consumer elimination, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may includes a processor unit 1030 (possibly including multiple processors, a single threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system bus 1040 (e.g., LDT, PCI, ISA, etc.), a network interface 1050 (e.g., an ATM interface, an Ethernet interface, a Frame Relay interface, etc.), and a storage device(s) 1009A-1009D (e.g., optical storage, magnetic storage, etc.). The memory medium may include other types of memory as well, or combinations thereof. Embodiments of the invention may include fewer or additional components not illustrated in FIG. 9 (e.g., video cards, audio cards, additional network interfaces, peripheral devices, etc.). The processor unit 1030, the storage device(s) 1009A-1009D, the network interface 1050, and the system memory 1010 are coupled to the system bus 1040. One or more of the system memories 1010 embody one or more shared FIFO queue implementations that include a central queue and an elimination mechanism.

In some embodiments, memory 1010 may include program instructions 1020 configured to implement producer and consumer elimination, as described herein. In certain embodiments memory 1010 may include program instructions configured to implement producer and/or consumer processes or threads, such as threads 103 and 105, configured perform elimination. Producer and consumer threads 103 and 105 may be implemented in any of various programming languages or methods. For example, in one embodiment, producer thread 103 and/or consumer thread 105 may be JAVA based, while in another embodiments, they may be written using the C or C++ programming languages.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
   a producer process atomically storing a data value to a transfer location;
   the producer process setting a status indicator for the transfer location to indicate a non-empty status;
   wherein the producer process atomically stores the data value to the transfer location and sets the status indicator for the transfer location as a single atomic operation;
   wherein the non-empty status of the status indicator indicates to a consumer process that the stored data value is ready for reading by the consumer process from the transfer location; and
   the producer process setting the status indicator for the transfer location to indicate an empty status in response to the consumer process setting the status indicator to indicate a done status.

2. The method of claim 1, further comprising:
   upon reading the stored data value from the transfer location, the consumer process atomically setting the status indicator for the transfer location to indicate a done status.

3. The method of claim 1, further comprising a consumer process setting the status indicator for the transfer location to indicate a waiting status, wherein said atomically storing a data value to the transfer location is in response to said setting the status indicator for the transfer location to indicate a waiting status.

4. The method of claim 3, further comprising the producer process setting a privacy indication for the transfer location to indicate that the data value is intended only for the consumer process that set the status indicator to a waiting status.

5. The method of claim 1, further comprising, for another data value stored to the transfer location, the producer process setting the status indicator for the transfer location to indicate an empty status in response to determining that no consumer process has set the status indicator to indicate a done status within a predetermined amount of time.

6. The method of claim 1, wherein the status indicator and the data value are stored at a single location in the transfer location and wherein said atomically storing a data value to the transfer location comprises said setting the status indicator to indicate a non-empty status.

7. The method of claim 1, wherein said atomically storing a data value to the transfer location comprises storing a pointer referencing a portion of shared memory storing the data value, wherein the portion of share memory is accessible to both the producer process and the consumer process.

8. The method of claim 7, wherein said setting the status indicator for the transfer location to indicate a done status comprises storing a pointer in the transfer location, wherein the pointer references a portion of shared memory indicating a done status indication.

9. The method of claim 1, wherein the single atomic operation comprises an atomic compare-and-swap operation.

10. The method of claim 1, further comprising the producer process selecting the transfer location randomly from among a plurality of potential transfer locations.

11. A system, comprising:
- a processor; and
- a memory, wherein the memory comprising program instruction executable by the processor to implement:
  - a consumer process; and
  - a producer process, wherein the producer process is configured to:
    - atomically store a data value to a transfer location;
    - set a status indicator for the transfer location to indicate a non-empty status;
    - wherein the producer process is configured to atomically store the data value to the transfer location and to set the status indicator for the transfer location as a single atomic operation; and
    - set the status indicator for the transfer location to indicate an empty status in response to the consumer process setting the status indicator to indicate a done status;
  - wherein the consumer process is configured to read the stored data value from the transfer location in response to the producer process setting the status indicator for the transfer location to indicate a non-empty status.

12. The system of claim 11 where the consumer process is configured to:
- upon reading the stored data value from the transfer location, atomically set the status indicator for the transfer location to indicate a done status.

13. The system of claim 11, where the consumer process is configured to set the status indicator for the transfer location to indicate a waiting status, wherein the processor is configured to perform said atomically storing a data value to the transfer location in response to the consumer process setting the status indicator for the transfer location to indicate a waiting status.

14. The system of claim 13, wherein the producer process is further configured to set a privacy indication for the transfer location to indicate that the data value is intended only for the consumer process.

15. The system of claim 11, wherein, for another data value stored to the transfer location, the producer process is configured to set the status indicator for the transfer location to indicate an empty status in response to determining that the consumer process has not set the status indicator to indicate a done status within a predetermined amount of time.

16. The system of claim 11, wherein the status indicator and the data value are stored at a single location in the transfer location and wherein said atomically storing a data value to the transfer location comprises said setting the status indicator to indicate a non-empty status.

17. The system of claim 11, wherein in atomically storing a data value to the transfer location, the producer process is configured to store a pointer referencing a portion of shared memory storing the data value, wherein the reference portion of shared memory is accessible to both the producer process and the consumer process.

18. The system of claim 11, wherein the single atomic operation comprises an atomic compare-and-swap operation.

19. The system of claim 11, wherein the producer process is further configured to select the transfer location randomly from among a plurality of potential transfer locations.

20. A computer accessible medium, comprising program instructions computer executable to implement:
- a producer process atomically storing a data value to a transfer location;
- the producer process setting a status indicator for the transfer location to indicate a non-empty status;
- wherein the producer process atomically stores the data value to the transfer location and sets the status indicator for the transfer location as a single atomic operation;
- wherein the non-empty status of the status indicator indicates to a consumer process that the stored data value is ready for reading by the consumer process from the transfer location; and
- the producer process setting the status indicator for the transfer location to indicate an empty status in response to the consumer process setting the status indicator to indicate a done status.

* * * * *